United States Patent
Crane, Jr. et al.

(10) Patent No.: US 6,700,138 B2
(45) Date of Patent: Mar. 2, 2004

(54) MODULAR SEMICONDUCTOR DIE PACKAGE AND METHOD OF MANUFACTURING THEREOF

(75) Inventors: Stanford W. Crane, Jr., Santa Clara, CA (US); Jennifer Colegrove, Sunnyvale, CA (US); Zsolt Horvath, Fremont, CA (US); Myoung-soo Jeon, Fremont, CA (US); Joshua Nickel, Santa Clara, CA (US); Lei-Ming Yang, Fremont, CA (US)

(73) Assignee: Silicon Bandwidth, Inc., San Jose, CA (US)

( * ) Notice: Subject to any disclaimer, the term of this patent is extended or adjusted under 35 U.S.C. 154(b) by 39 days.

(21) Appl. No.: 10/081,146

(22) Filed: Feb. 25, 2002

(65) Prior Publication Data

US 2003/0160314 A1 Aug. 28, 2003

(51) Int. Cl.⁷ .......................... H01L 33/00; H01L 23/02
(52) U.S. Cl. .............................. 257/99; 257/79; 257/80; 257/81; 257/82; 257/83; 257/84; 257/98; 257/678; 257/680; 257/690; 257/692; 257/693; 257/694; 257/697; 257/704; 257/729; 257/711

(58) Field of Search ................................ 257/79–84, 98, 257/99, 678, 680, 690, 692, 693, 694, 697, 704, 729, 711; 372/43, 50, 98, 108, 29.022, 29.013, 38.05

(56) References Cited

U.S. PATENT DOCUMENTS

| 5,323,025 A | * | 6/1994 | Ito et al. ........................ 257/81 |
| 5,953,355 A | * | 9/1999 | Kiely et al. .................... 372/43 |
| 6,541,800 B2 | * | 4/2003 | Barnett et al. ................. 257/98 |

* cited by examiner

Primary Examiner—David A. Zarneke
(74) Attorney, Agent, or Firm—Morgan, Lewis & Bockuis LLP

(57) ABSTRACT

A modular semiconductor die package is provided. The semiconductor die package includes a polymer base for mounting at least one semiconductor die. A polymer cap is operatively secured over the base forming a cavity. The cap includes a light transmissive member operatively positioned to allow light of predetermined wavelengths to pass between at least a portion of the surface of the die and the light transmissive member. A plurality of conductive leads extend through the base to form connections with the semiconductor die(s) positioned in the cavity.

21 Claims, 34 Drawing Sheets

FLAT WINDOW EXAMPLE: FINAL DIMENSION: 3.5X3.5X0.4mm

FLAT WINDOW ANALYSIS EXAMPLE

MAXIMUM: THE DIAMETER OF THE CAP IS: 4.5 TO 4.9mm

MINIMUM: CONE DIAMETER OF LIGHT FROM VCSEL IS: ~0.6mm

4 TO 12 DEGREE FWHM DIVERGE ANGLE: 2 TO 6°
VCSEL ACTIVE AREA: 5 TO 16 um
1mm

IN THIS EXAMPLE, FLAT GLASS SIZE MAY BE:
1~4mm IN DIAMETER, 0.3~0.65mm IN THICKNESS.

MODULAR SEMICONDUCTOR DIE PACKAGE AND METHOD OF MANUFACTURING THEREOF

FIELD OF THE INVENTION

The present invention relates to semiconductor die packages and, more particularly, to modular semiconductor die packages for light emitting and/or light receiving semiconductor devices, such as laser diodes and photodetectors, and methods of manufacturing thereof.

BACKGROUND OF THE INVENTION

Optical transmitters and optical receivers are widely used in a variety of applications including, for example, telecommunications, computing, entertainment, and medical devices. Laser diodes, such as Vertical Cavity Surface Emitting Lasers (VCSELs), are frequently mounted in Transistor Outline style cans (TO-cans). TO-cans for optical applications are metal packages that typically have a windowed top, allowing light to pass through. There are several industry standard metal TO-cans available in different base diameters and lead configurations, including, for example, the TO-46 flat window metal can. Other packages include TO-3 packages, used for higher power laser diodes. Conventional TO-packages are typically costly to manufacture due in part to a lack of modularity in design, and therefore do not lend themselves to economies of scale in production.

Conventional metal TO-cans used for semiconductor lasers or detectors have a window arranged in a plane perpendicular to the emitting direction of the laser beam. In order to prevent light reflecting from the window from reentering the semiconductor emitting device and interfering with or damaging the laser, anti-reflection (AR) coatings are applied to the window. However, AR coatings may contribute significantly to the per unit cost of production, since they require additional processing steps to manufacture. Accordingly, a need exists for a cost-effective method of preventing light reflected from the window of the package from re-entering and interfering with the light emitting semiconductor device, while maintaining high coupling efficiency, low insertion loss, and without requiring the use of anti-reflective coatings on the window of the package.

In certain optical communications systems, for example, signaling speeds may reach or exceed 10 GHz, or even 40 GHz. Consequently, there exists a need for precision modular packages with leads capable of accommodating the high speed signaling requirements associated with optical applications without generating unwanted RF interference.

Further, because conventional metal TO-cans were originally intended to house transistors, not precision optical components requiring exacting alignment, metal TO-cans often do not provide the high tolerances required for automated assembly in optical applications. For example, when metal TO-can packaging is used, manual alignment of the semiconductor device and the package is often required during production to ensure critical tolerances are maintained, making automation impractical and increasing manufacturing costs. Conventional semiconductor laser packaging, such as metal TO-cans, suffer from other disadvantages including high material cost and the need for special fabrication steps to integrate glass or plastic windows onto the metal can packaging.

Accordingly, there is a need for improved optical semiconductor packaging and methods of manufacturing that afford high degrees of automation and economies of scale, while providing increased precision and tolerancing in the finished product with less waste of materials. A further need exists for modular packaging that may accommodate different mounting techniques (e.g., surface mount, through-hole mount, etc.) in a common package design. A need also exists for a modular package design that allows separate processing of cumbersome elements, such as pin extensions for through-hole mounting, until final assembly of the package.

SUMMARY OF THE INVENTION

A semiconductor die package is provided. The semiconductor die package includes a polymer base comprising a lower surface and an upper surface, the upper surface for mounting at least one semiconductor die. A polymer cap is operatively secured over at least a portion of the upper surface of the base forming a cavity, the cap having a light transmissive member operatively positioned to allow light of predetermined wavelengths to pass between at least a portion of the upper surface of the base and the light transmissive member. A plurality of conductive leads extend through the base from the lower surface of the base to the cavity.

A matrix of semiconductor die packages is also provided. The matrix of semiconductor die packages includes a base matrix comprising a plurality of polymer bases, each base comprising a surface for mounting at least one semiconductor die. The matrix of semiconductor die packages also includes a cap matrix comprising a plurality of polymer caps operatively secured over the base matrix, each base and cap combination forming a cavity, each cap having a light transmissive member operatively positioned to allow light of predetermined wavelengths to pass between the surface for mounting at least one semiconductor die of a corresponding base and the light transmissive member. A plurality of conductive leads extend through each base from an outside surface of each base to the corresponding cavity formed by each cap and base combination.

A method of making a semiconductor die package is further provided. The method of making a semiconductor die package includes forming a polymer base comprising a lower surface and an upper surface, the upper surface for mounting at least one semiconductor die; forming a polymer cap operatively secured over at least a portion of the upper surface of the base forming a cavity, the cap having a light transmissive member operatively positioned to allow light of predetermined wavelengths to pass between at least a portion of the upper surface of the base and the light transmissive member; and forming a plurality of conductive leads extending through the base from the lower surface of the base to the cavity.

A method of making semiconductor die packages is also provided. The method of making semiconductor die packages includes forming a base matrix comprising a plurality of polymer bases, each base comprising a surface for mounting at least one semiconductor die; forming a cap matrix comprising a plurality of polymer caps operatively secured over the base matrix, each base and cap combination forming a cavity, each cap having a light transmissive member operatively positioned to allow light of predetermined wavelengths to pass between the surface for mounting at least one semiconductor die of a corresponding base and the light transmissive member; and positioning a plurality of conductive leads extending through each base from an outside surface of each base to the corresponding cavity formed by each cap and base combination.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT(S)

Reference will now be made in detail to the present exemplary embodiment(s) of the invention illustrated in the accompanying drawings. Wherever possible, the same reference numbers will be used throughout the drawings to refer to the same or like parts.

Figure 1A:
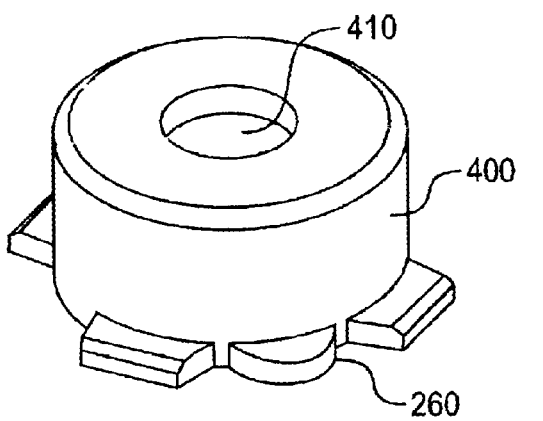
FIGS. 1A–D provide an exploded view of an exemplary embodiment of a semiconductor die package according to the present invention.
Figure 1B:
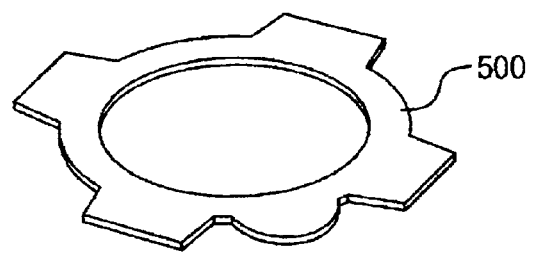
Figure 1C:
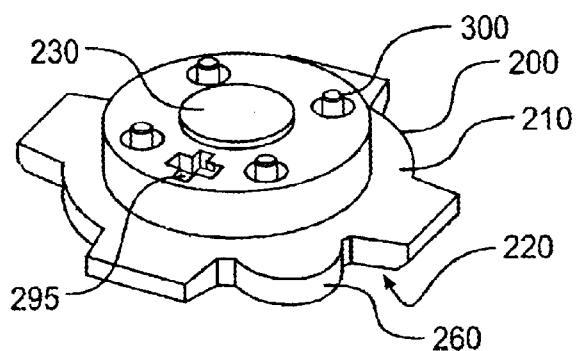
Figure 1D:
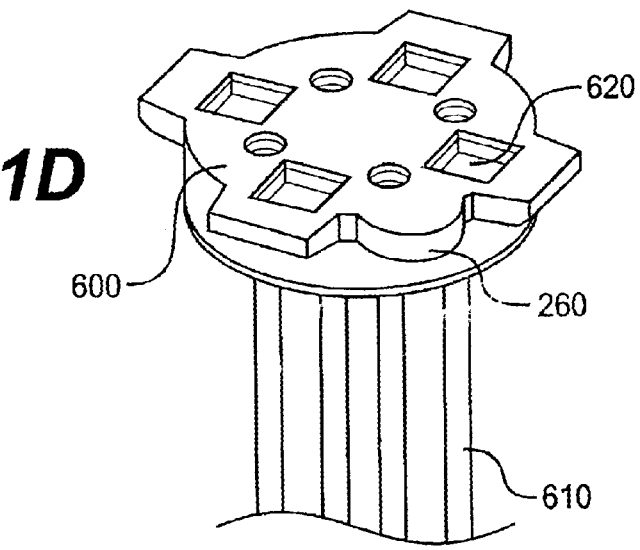

FIGS. 1A–16 illustrate exemplary embodiments of a semiconductor die package 100 for packaging semiconductor die(s) according to the present invention. FIGS. 1A–1D provide an exploded view of the semiconductor die package components shown in FIGS. 2–16. As shown in FIGS. 1A–1C, semiconductor die package 100 includes a base 200 for holding one or more semiconductor dies, pins 300 retained in the base 200 for use in forming electrical connections to the semiconductor die(s), and a cap 400 secured to an upper circumferential surface 210 of the base 200, optionally with a preformed adhesive 500. FIG. 1D depicts an optional leg extension 600 that may be securably attached to a lower surface 220 of the base 200 to enable through-hole mounting of the die package 100 on a printed circuit board. Alternatively, when the leg extension 600 is not employed, the base 200 may be surface mounted directly onto a printed circuit board using any conventional surface mount technology. The bodies of the base 200, cap 400 and leg extension 600 are preferably molded of a light absorbing dark colored plastic or polymer, such as liquid crystal plastic (LCP), capable of withstanding high temperatures without exhibiting significant distortion. Suitable materials include VECTRA®, which is a liquid crystal polymer plastic commercially available from Hoechst Technical Polymers, THERMALGRAPH™ available from Amoco Performance Products, Inc., COOLPOLY® D2, which is a liquid crystal polymer plastic available from Cool Polymers, Inc., and KOVAR®, which is commercially available from Carpenter Technology Corporation. However, other thermally stable materials that exhibit high mechanical strength, high dielectric strength, high thermal conductivity and low coefficient of thermal expansion may also be used. Cooling fins and/or heat sinks may be provided to any combinations of the base 200, cap 400, and leg extension 600, for thermal management. In a preferred embodiment, the base 200, cap 400, and/or leg extension 600 (if present) may be partially or completely metalized or plated with metal on one or more surfaces to provide, for example, shielding or ground planes.

Figure 2:
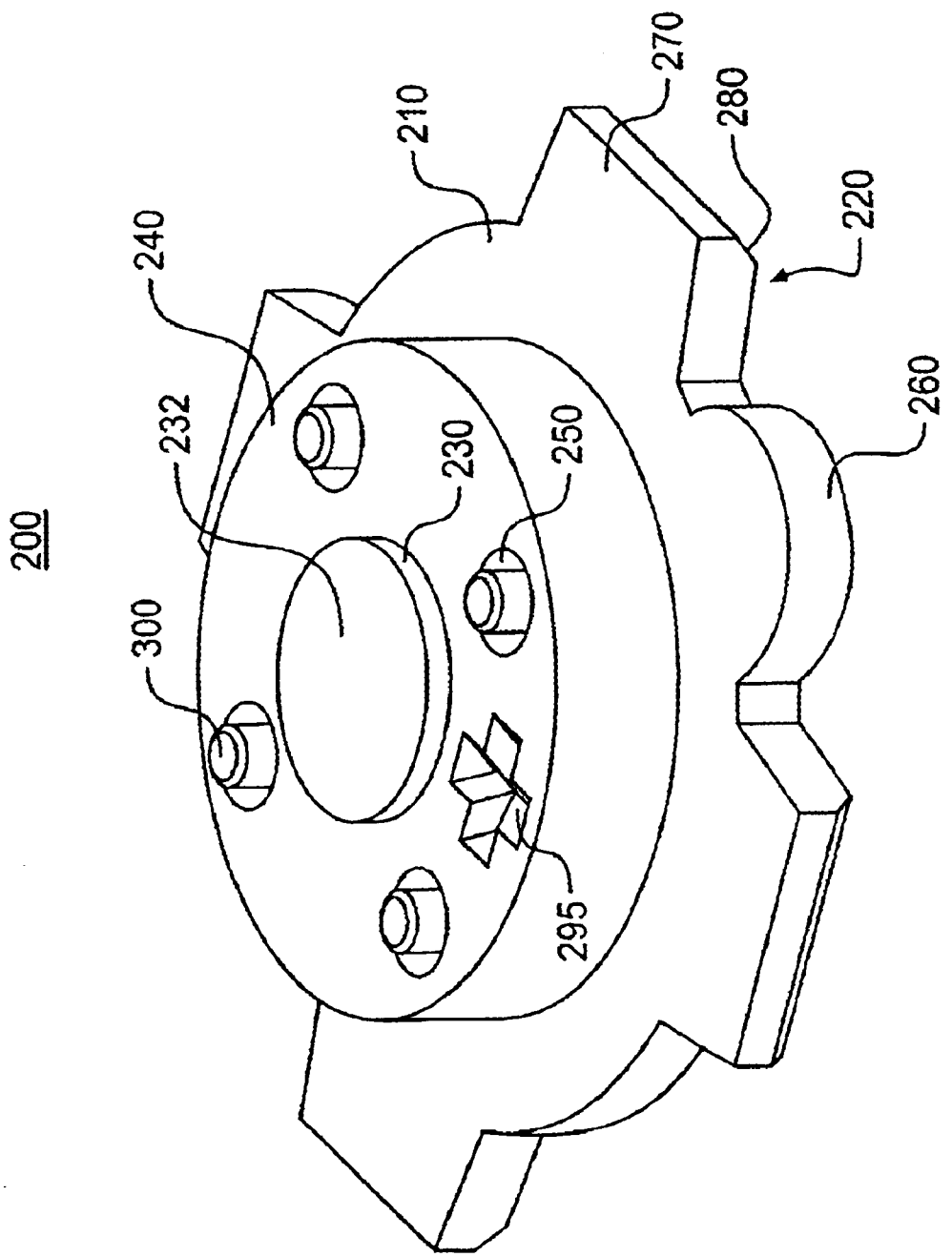
FIG. 2 illustrates an exemplary embodiment of a base in accordance with the principles of the present invention.

Referring to FIGS. 2–6, the base 200 optionally includes a pedestal 230 having a surface 232 for semiconductor die placement. The pedestal 230 may be integrally molded from the same material as used to form the base 200. Alternatively, the pedestal 230 may be formed of a different material from that used to form the base 200. For example, the pedestal 230 may formed of a material having different thermal conductivity characteristics from the material used to form the base 200. In a preferred embodiment, the pedestal 230 may be formed of a material having a coefficient of thermal expansion that closely matches or approximates the coefficient of thermal expansion of the die(s) mounted on the pedestal so as to reduce stress on the die(s). Additionally, the pedestal 230 may be formed of a material having better thermal conductivity than the base 200, thereby reducing thermal stress on the die. Exemplary materials for the pedestal 230 include copper, copper-tungsten alloys, aluminum nitride, ceramic, and/or diamond, among others. In a preferred embodiment, the pedestal 230 may be formed of a plastic having a higher thermal conductivity than the thermal conductivity of the base 200. While FIG. 2 depicts an exemplary embodiment where the pedestal surface 232 is positioned above the top surface 240 of the base 200, the pedestal surface 232 may alternatively be positioned flush with the top surface 240 of the base 200, or below the top surface 240 of the base 200. The pedestal 210 may be insert-molded, adhesively secured or welded to the base 200. Alternatively, the pedestal 210 may be secured to the base 200 in any conventional manner.

Figure 5:
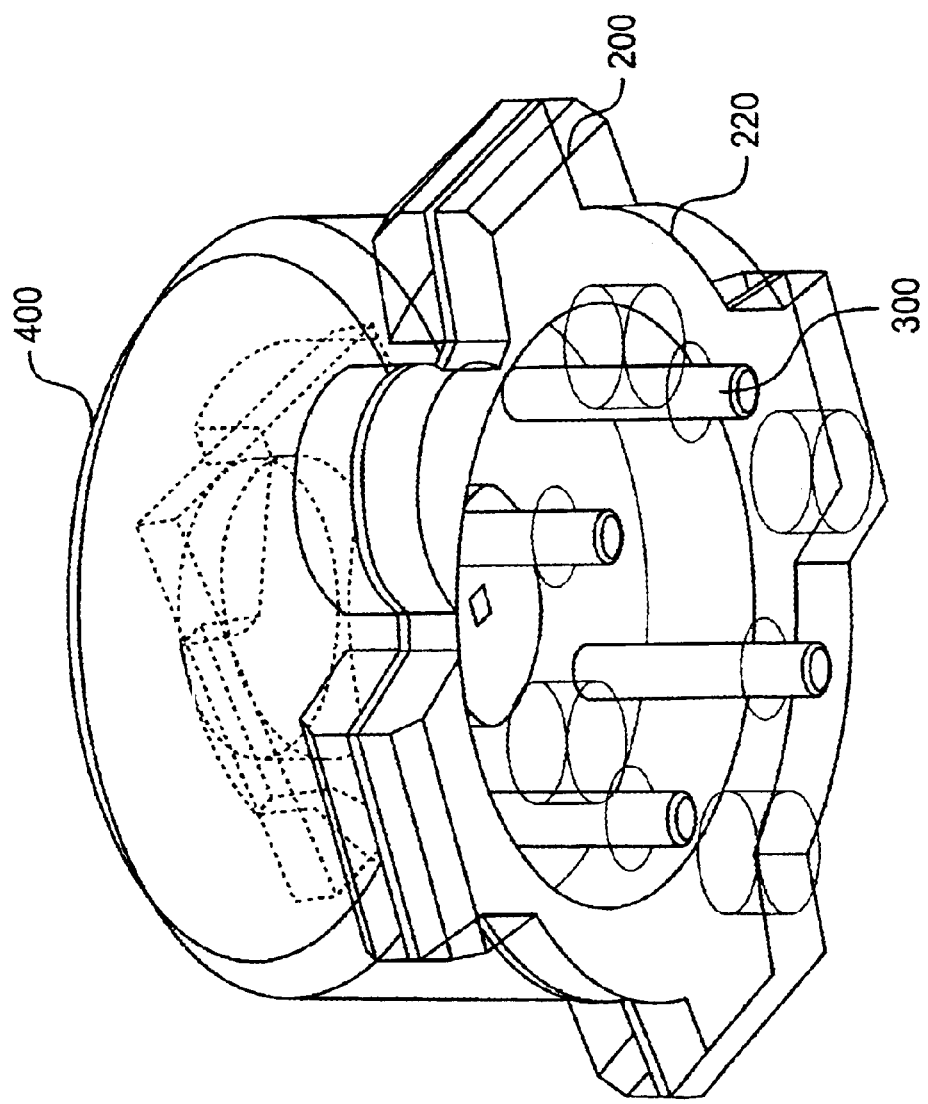
FIG. 5 illustrates an exemplary embodiment of a base and cap in accordance with the principles of the present invention.
Figure 6:
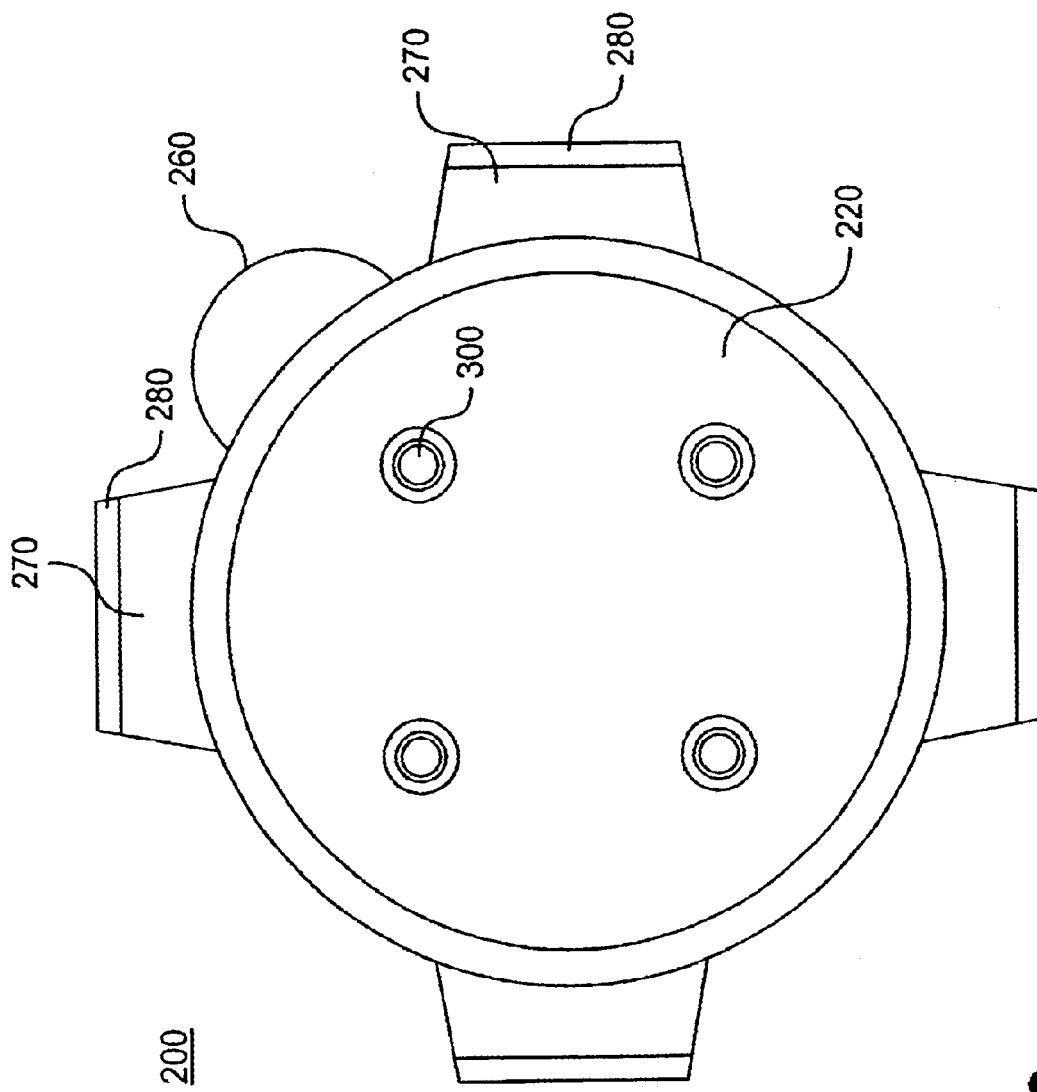
FIG. 6 illustrates a bottom view of an exemplary base in accordance with the principles of the present invention.

FIGS. 5 and 6 depict a plurality of electrically conductive pins 300 extending from the lower surface 220 through to the top surface 240 of the base 200. The pins 300 may be inserted through the base 200 after the base 200 is molded. Alternatively, the base 200 may be molded around the pins 300. Referring back to FIG. 2, in a preferred embodiment, wells 250 for receiving sealant are provided around the circumference of the pin through-holes to enable hermetic sealing of the die package 100. While FIG. 2 depicts the wells 250 as being formed around the circumference of the pins 300 in the top surface 240 of the base 200, the wells 250 may also be suitably formed in the base 200 around the circumference of the pins 300 where the pins 300 extend through the lower surface 220 of the base 200. Pins 300 will be described in greater detail in connection with FIG. 12.

One or more semiconductor dies 800 (FIG. 3) may be mounted on the pedestal 230 and/or directly on a surrounding structure of the base 200 with, for example, an adhesive, such as epoxy or other suitable mounting means. If plural semiconductor dies are present, electrical connections may be formed directly between dies using any conventional interconnect method.

Electrically conductive material (not shown), such as bonding wire, tape automated bonding, jumpers, and/or other electrically conductive material, may be used to electrically connect the pins 300 to the semiconductor die(s) 800. Not all of the pins 300 need to be electrically connected to the semiconductor die(s) 800. Some of pins 300 may not be connected to any electrically conductive element on the base 200. Alternatively or in addition, some of pins 300 may be electrically connected to electromagnetic interference (EMI) or electrostatic discharge (ESD) shielding either internal or external to the base 200, a ground or power plane included within the base 200, or another electrical component within the base 200.

Figure 7:
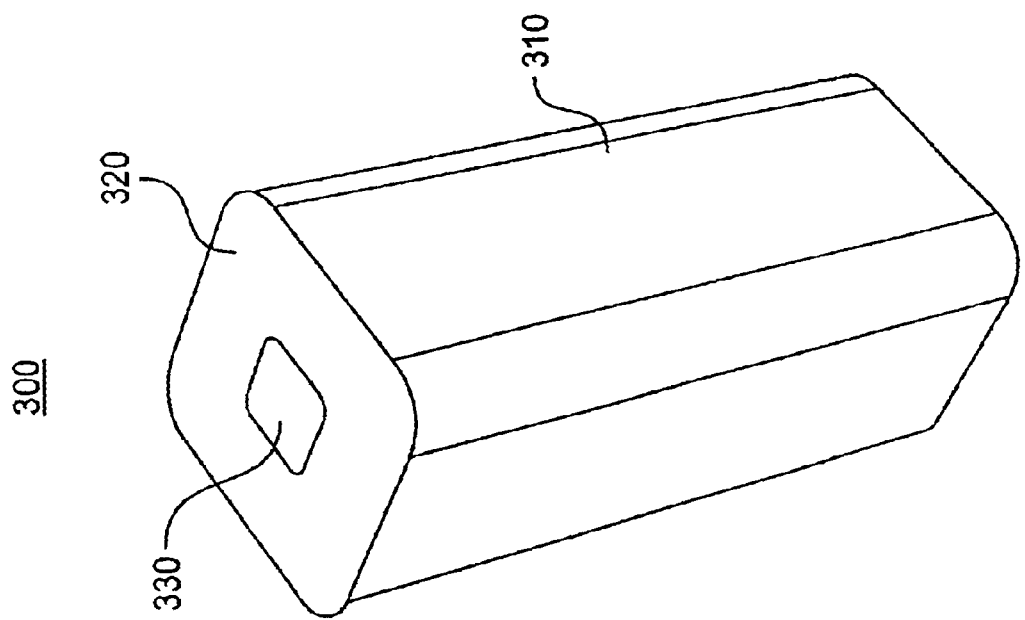
FIG. 7 illustrates an exemplary embodiment of a coaxial pin in accordance with the principles of the present invention.

Referring to FIG. 7, the electrically conductive pins 300, which are positioned in the base 200, may optionally be formed with an outer conductive layer 310 coaxially arranged around a dielectric 320 and a center conductor 330. Such a coaxial arrangement couples the electromagnetic field generated by the current flowing in the center conductor 330 to a return path formed by the outer conductive layer 310, thereby enabling high signaling rates to be achieved while reducing unwanted RF interference. It is believed that signaling rates on the order of 40 GHz may be possible, depending on, for example, the particular materials used, voltages, geometry and length of the pin. Another method of achieving a coaxial pin is to metalize the pin through-holes in the base 200 and coat the pins with a dielectric before inserting them in the through-holes.

As shown in FIG. 7, the center conductor 330 may have a square cross section. The center conductor 330 may also have a circular cross section, a rectangular cross section or a cross section of any other suitable geometric shape. Similarly, the dielectric 320 and outer conductive layer 310 may have square cross sections, circular cross sections, rectangular cross sections or cross sections of any other suitable geometric shape. In a preferred embodiment, the outer conductive layer 310, dielectric 320, and center conductor 330 have corresponding or identical cross sectional geometric shapes. Wire bonds forming electrical connections between coaxial pins and the semiconductor dies located in the package are preferably made using the center conductor 330 of the die pads. However, electrical connections may be formed between the outer conductive layer 310 and die pads, or between any components housed within or forming the die package 100. The outer conductive layer 310 may comprise gold, aluminum, nickel, tin, silver, copper, or any other suitable conductive material, or combinations thereof. The center conductor 330 may comprise gold, aluminum, nickel, tin, silver, copper, or any other suitable conductive material, or combinations thereof. The dielectric 320 may comprise TEFLON® available from E. I. du Pont de Nemours and Co., however, other dielectric materials may be used as well.

Figure 3:
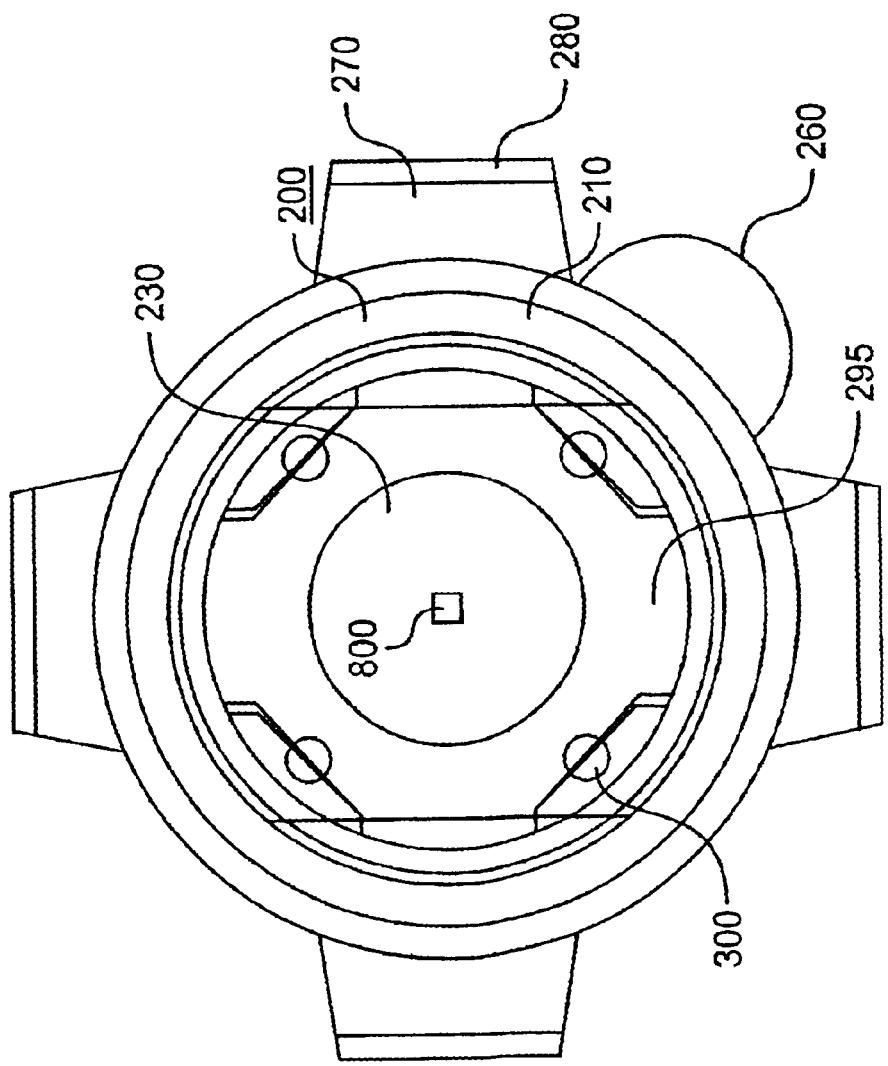
FIG. 3 illustrates an exemplary embodiment of a base in accordance with the principles of the present invention.
Figure 4:
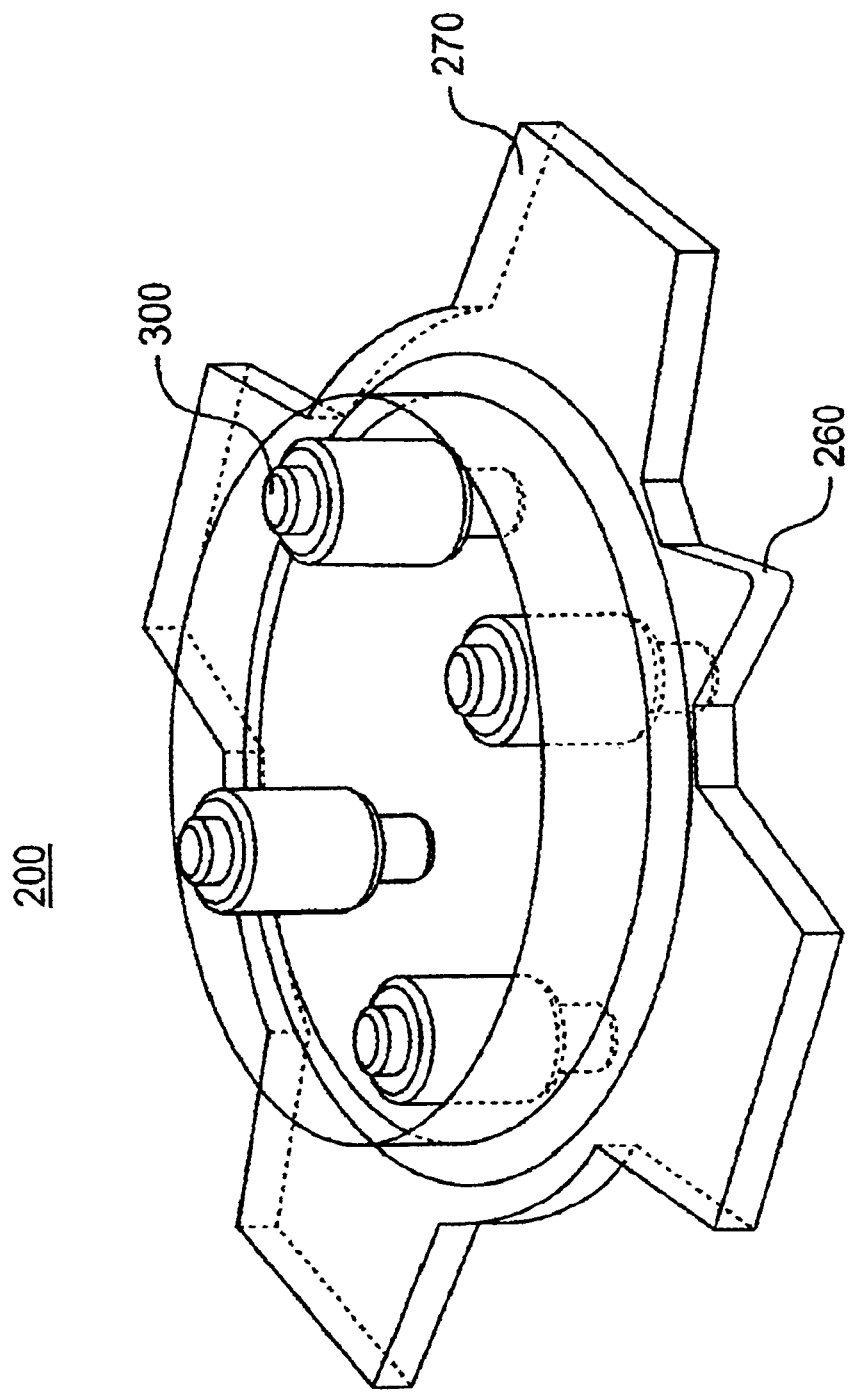
FIG. 4 illustrates an exemplary embodiment of a base in accordance with the principles of the present invention.

Referring to FIGS. 2 and 3, optical alignment mark(s) or reticle(s) 295 may be provided in the top surface 240 of the base 200 to provide a reference point for precision alignment during processing steps such as positioning of the semiconductor die on the pedestal surface 232. An alignment pocket or projection reference 260 may also be provided in the base 200, for example along a peripheral region of the base 200, to ensure correct orientation of the package is maintained during manufacturing. The alignment pocket or projection reference 260 may be semicircular in shape, as shown in FIGS. 2 and 3, angular in shape, as shown in FIG. 4, or any other suitable shape. As shown in FIGS. 1A and 1D, the cap 400 and optional leg extension 600 (if present) are preferably formed with corresponding alignment pockets or projection references 260 that align with the alignment pockets or projection references 260 of the cap 400 when the die package 100 is assembled.

Figure 8:
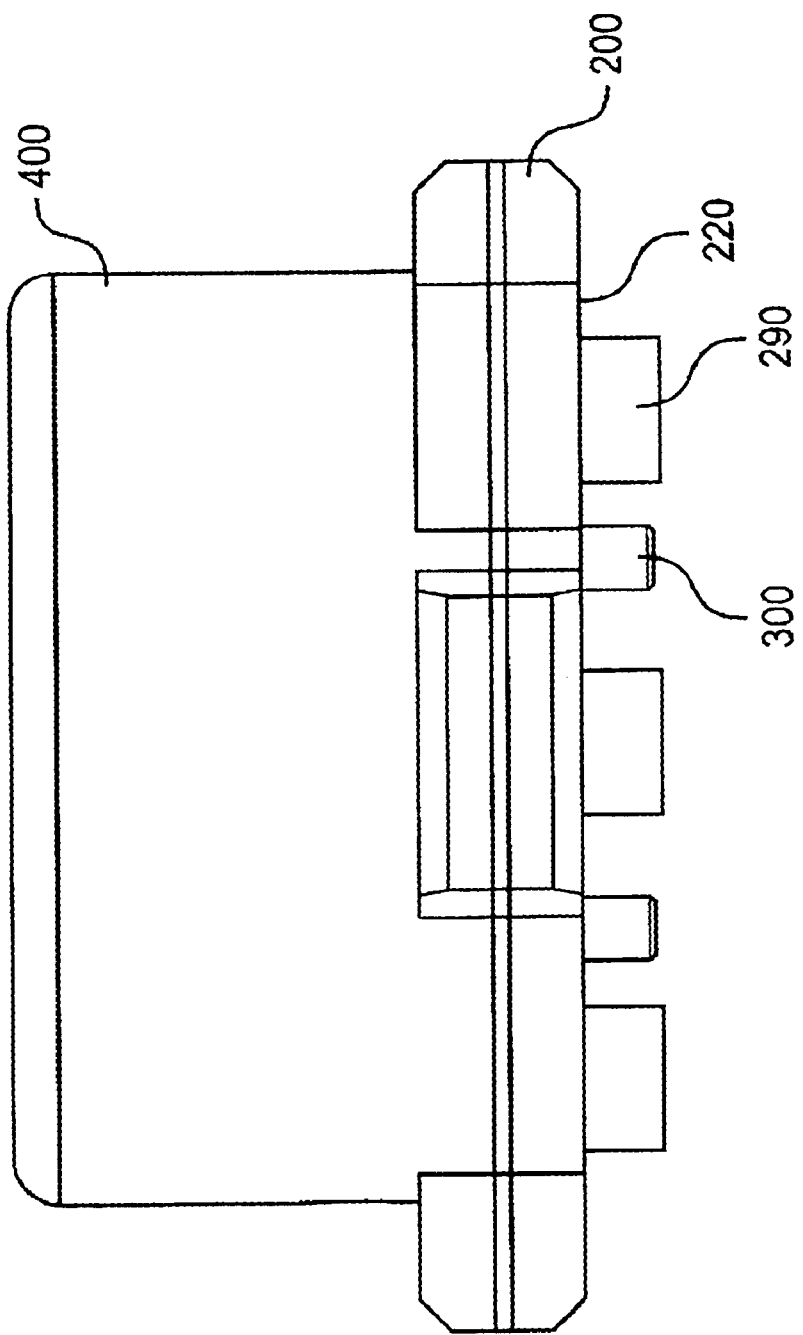
FIG. 8 illustrates an exemplary embodiment of an assembled base and cap for surface mounting in accordance with the principles of the present invention.
Figure 9:
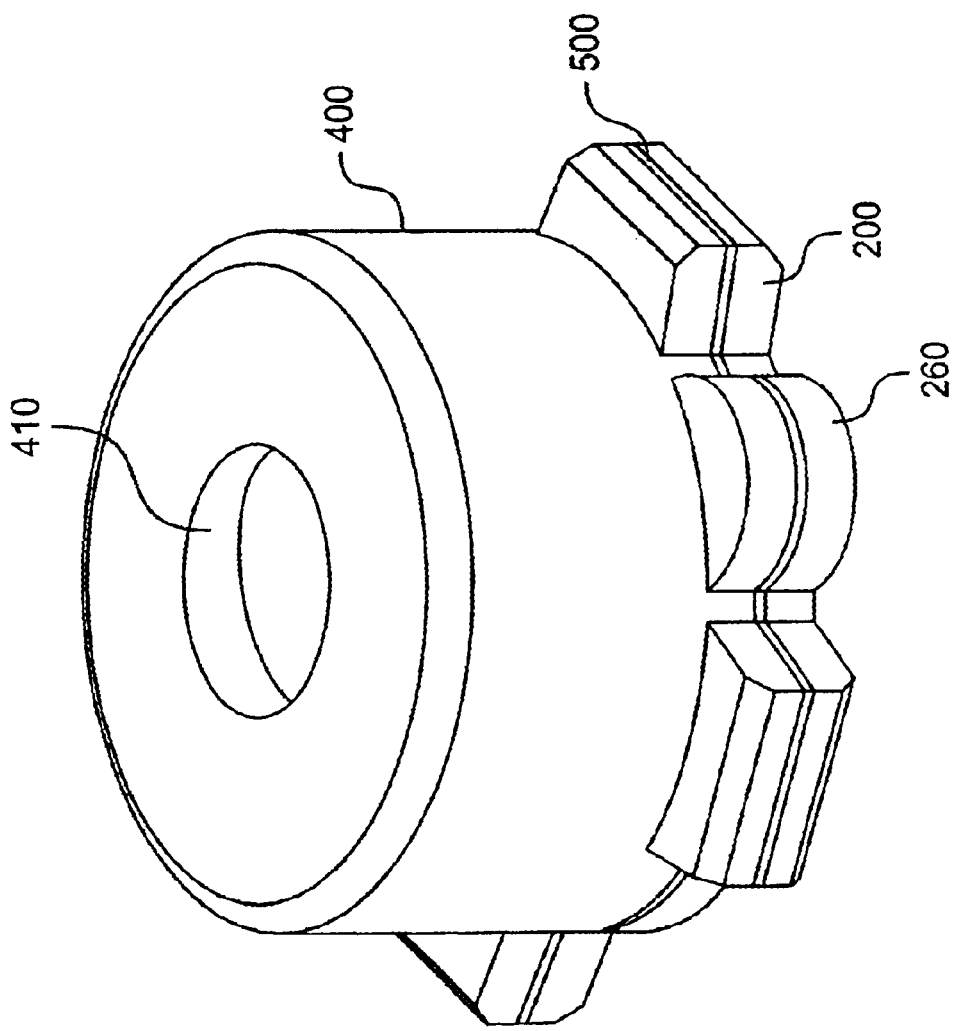
FIG. 9 illustrates an exemplary embodiment of an assembled base and cap having a window in accordance with the principles of the present invention.
Figure 10:
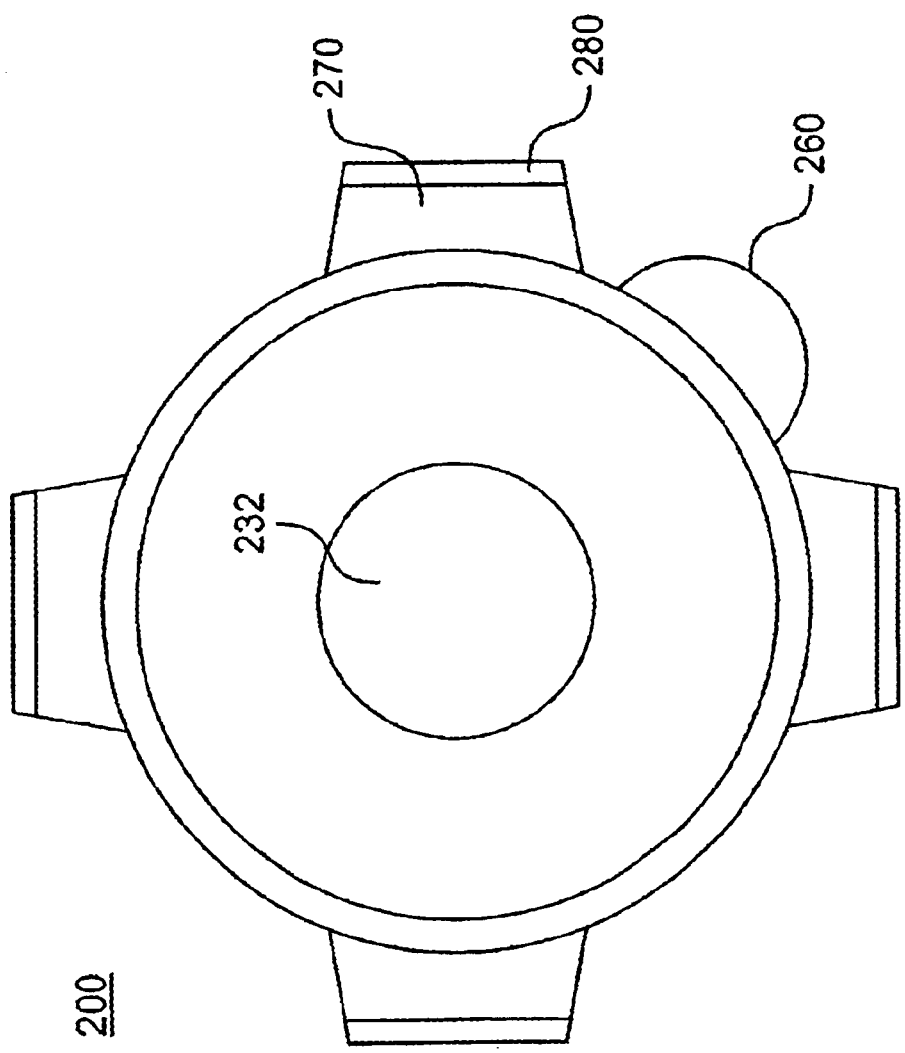
FIG. 10 illustrates a top view of an exemplary embodiment of a cap having a window in accordance with the principles of the present invention.

FIGS. 8–10 are views of the assembled die package 100. Electrically conductive pins 300 extend from the lower surface 220 a sufficient distance to enable surface mounting of the die package 100 to a printed circuit board. Stand offs 290 (depicted in FIG. 8) may optionally be provided on the lower surface 220 of the base 200 to ensure uniform spacing between the die package 100 and the printed circuit board (when the die package 100 is surface mounted), or to engage corresponding indentations 620 (shown in FIGS. 1D and 11) formed in the upper surface of the leg extension 600 (when the die package 100 is through-hole mounted). As illustrated in FIG. 8, when stand offs 290 are present, the pins 300 preferably extend away from the lower surface 220 slightly less than the height of the stand offs 290. Of course, the pins 300 may also be level with the stand offs 290 or extend slightly beyond the stand offs 290, as desired for a particular application. In applications where the base 200 is to be surface mounted directly onto a printed circuit board, the base 200 may be mounted using solder reflow techniques, solder balls, or any conventional mounting method.

Figure 11:
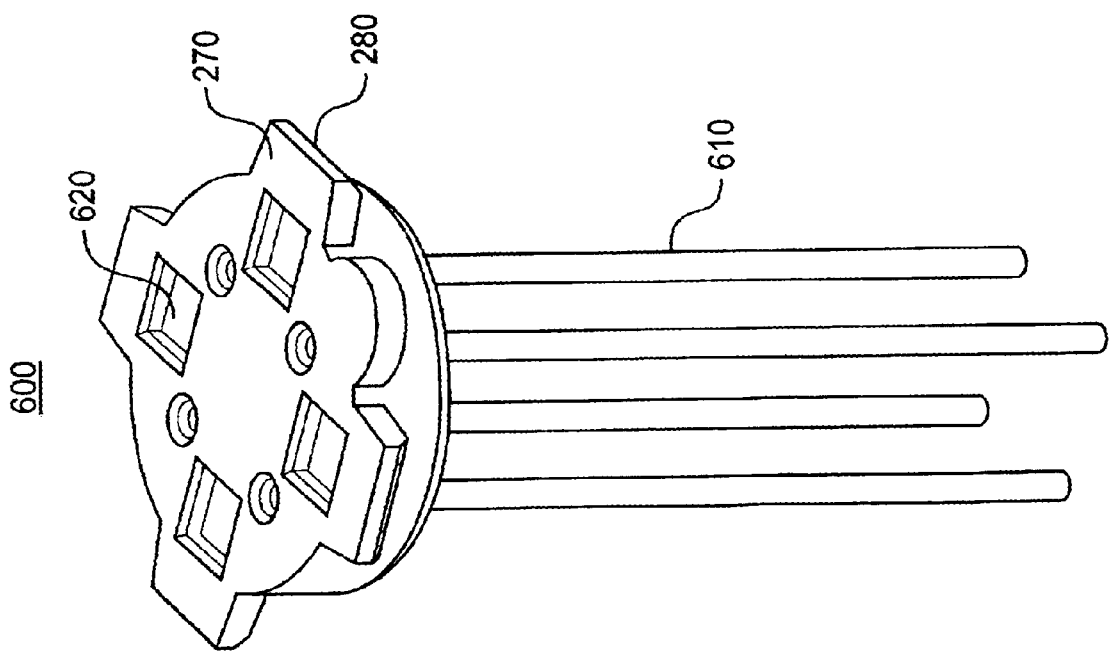
FIG. 11. illustrates an exemplary embodiment of a leg extension lead base in accordance with the principles of the present invention.
Figure 12:
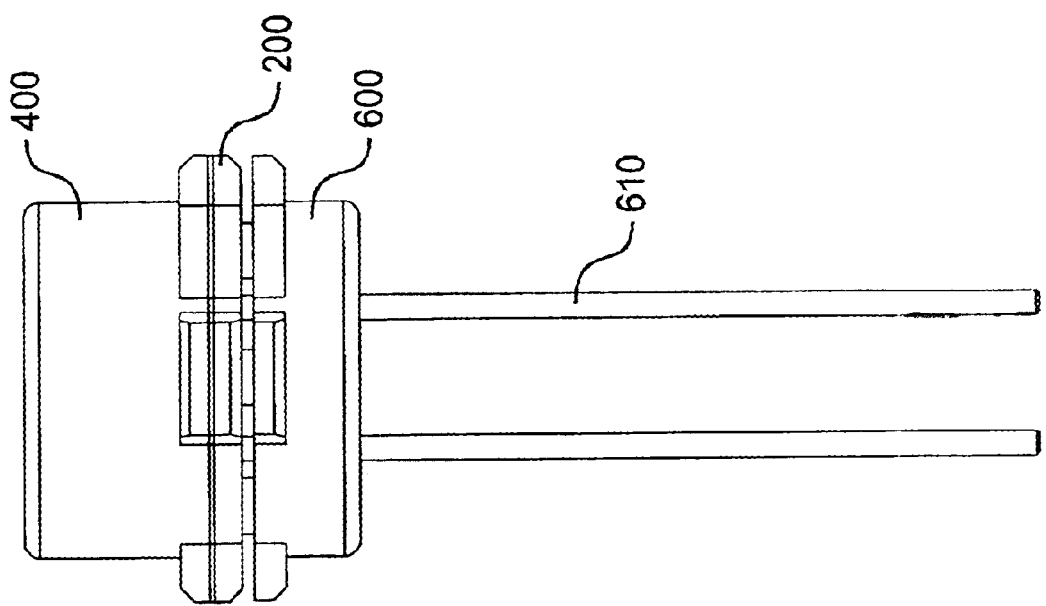
FIG. 12 illustrates an exemplary embodiment of an assembled cap, base, and leg extension lead base in accordance with the principles of the present invention.
Figure 13:
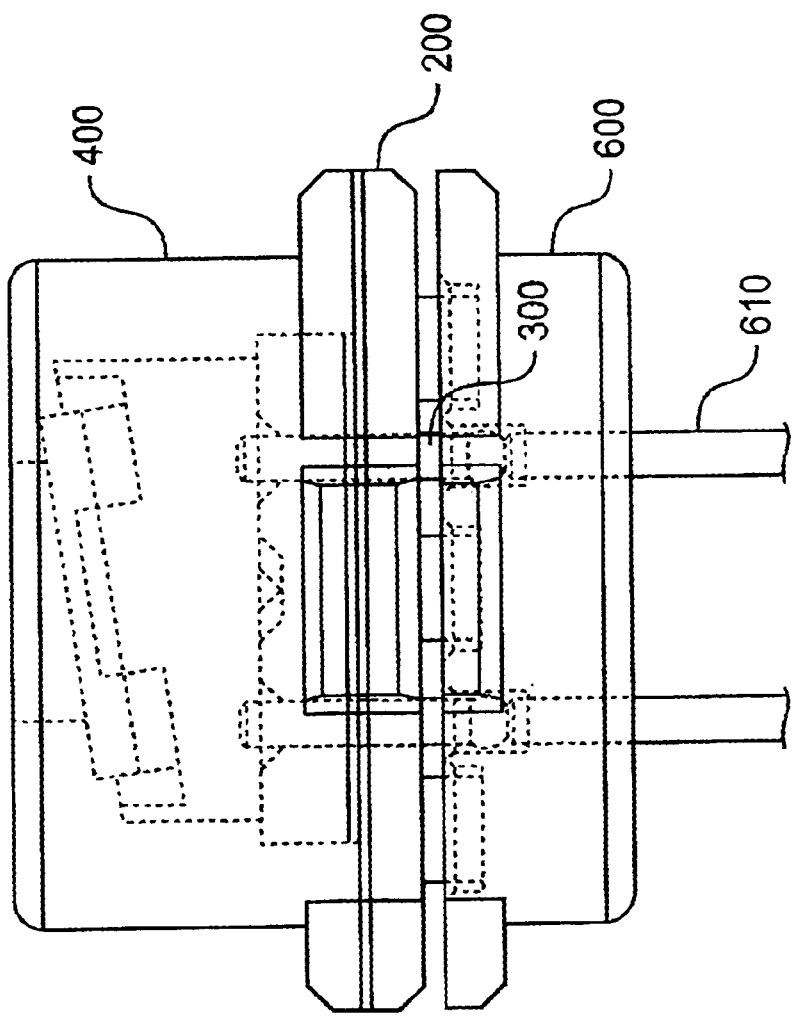
FIG. 13 illustrates an exemplary embodiment of an assembled base with leg extension and cap having a tilted window in accordance with the principles of the present invention.

Referring to FIGS. 11–13, a modular leg extension 600 may be provided to enable through-hole mounting of the base 200 on, for example, a printed circuit board. The leg extension 600 includes a plurality of conductive pins 610 extending though the body portion of the leg extension 600. The pins 610 may be inserted through the body of the leg extension 600 after the body of the leg extension 600 is molded. Alternatively, the body of the leg extension 600 may be molded around the pins 610. The upper surface of the leg extension 600 may include indentations 620 for engaging base stand offs 290, ensuring positive alignment of the base 200 and leg extension 600. As depicted in FIG. 13, the leg extension conductive pins 610 may be electrically coupled to the pins 300 extending from the lower surface 220 of the base 200 via solder reflow, solder balls, or any conventional method. Alternatively or in addition, the body of the leg extension 600 may be physically coupled to the base 200 by soldering the leg extension pins 610 with the base pins 300, adhesively bonding the base 200 to the leg extension 600, welding the base 200 to the leg extension 600, by an interference fit of the base stand offs 290 (shown on FIG. 8) with the leg extension depressions 620 (shown on FIGS. 1D and 11), by clipping the base 200 to the leg extension 600, or by any conventional method.

Figure 14:
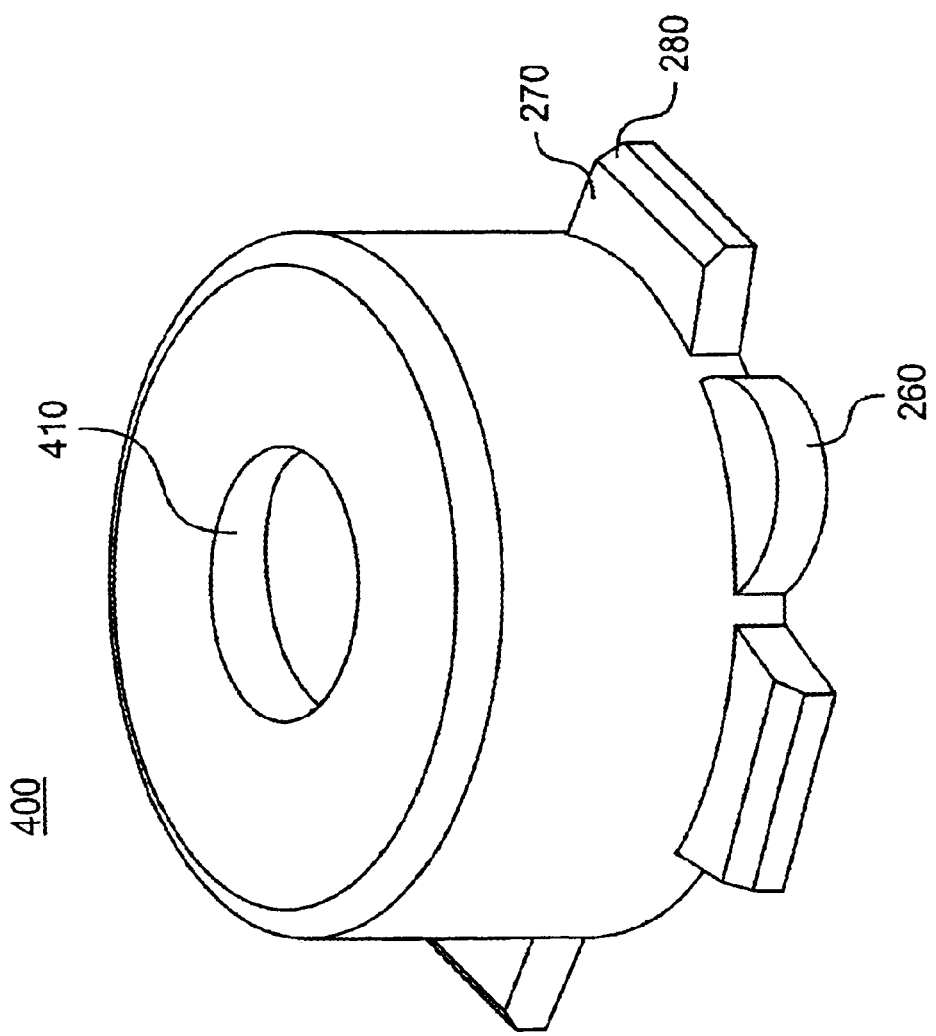
FIG. 14 illustrates an exemplary embodiment of a cap having a window and alignment projection indicator in accordance with the principles of the present invention.
Figure 15:
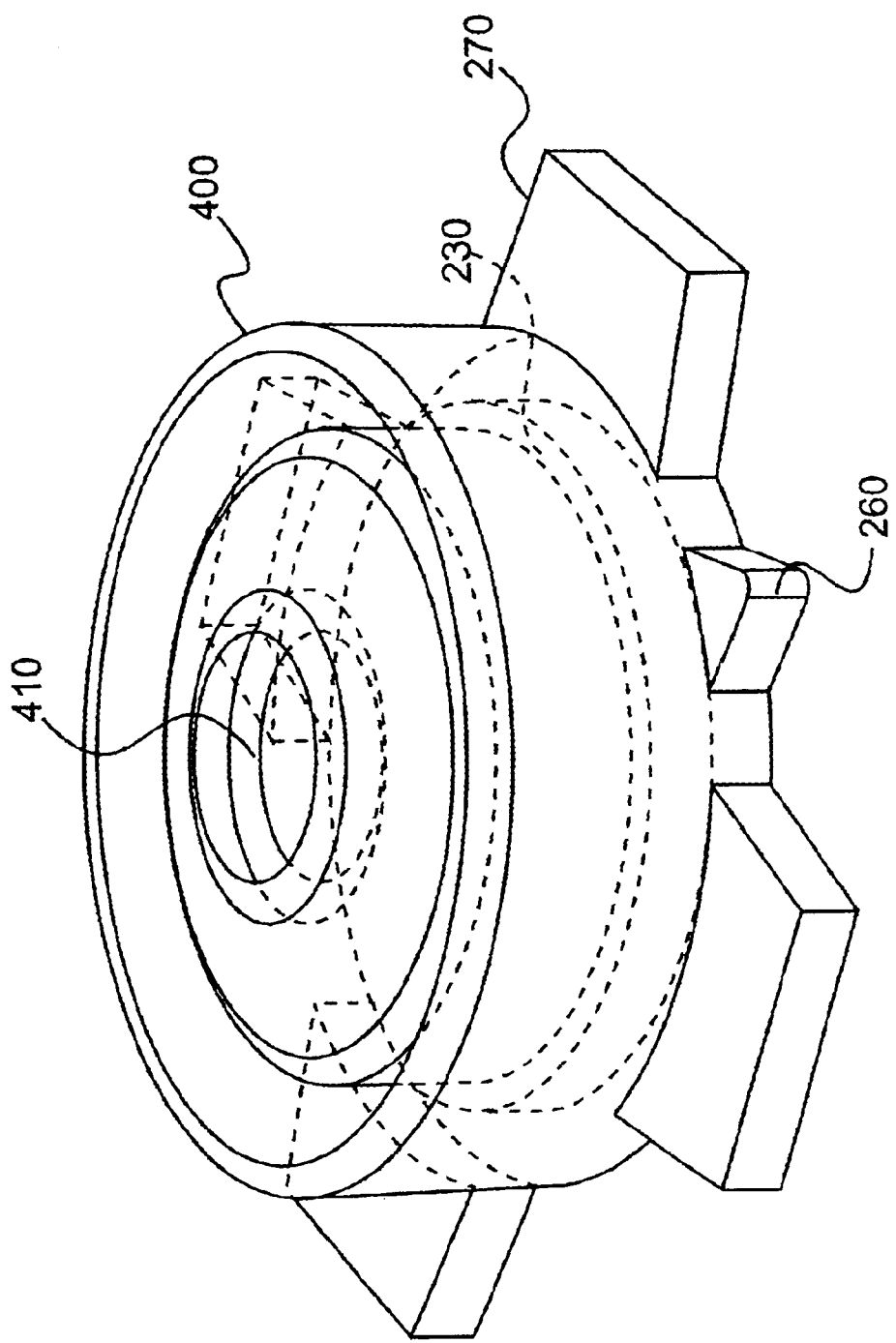
FIG. 15. illustrates an exemplary embodiment of a cap having a window and alignment projection indicator in accordance with the principles of the present invention.
Figure 16:
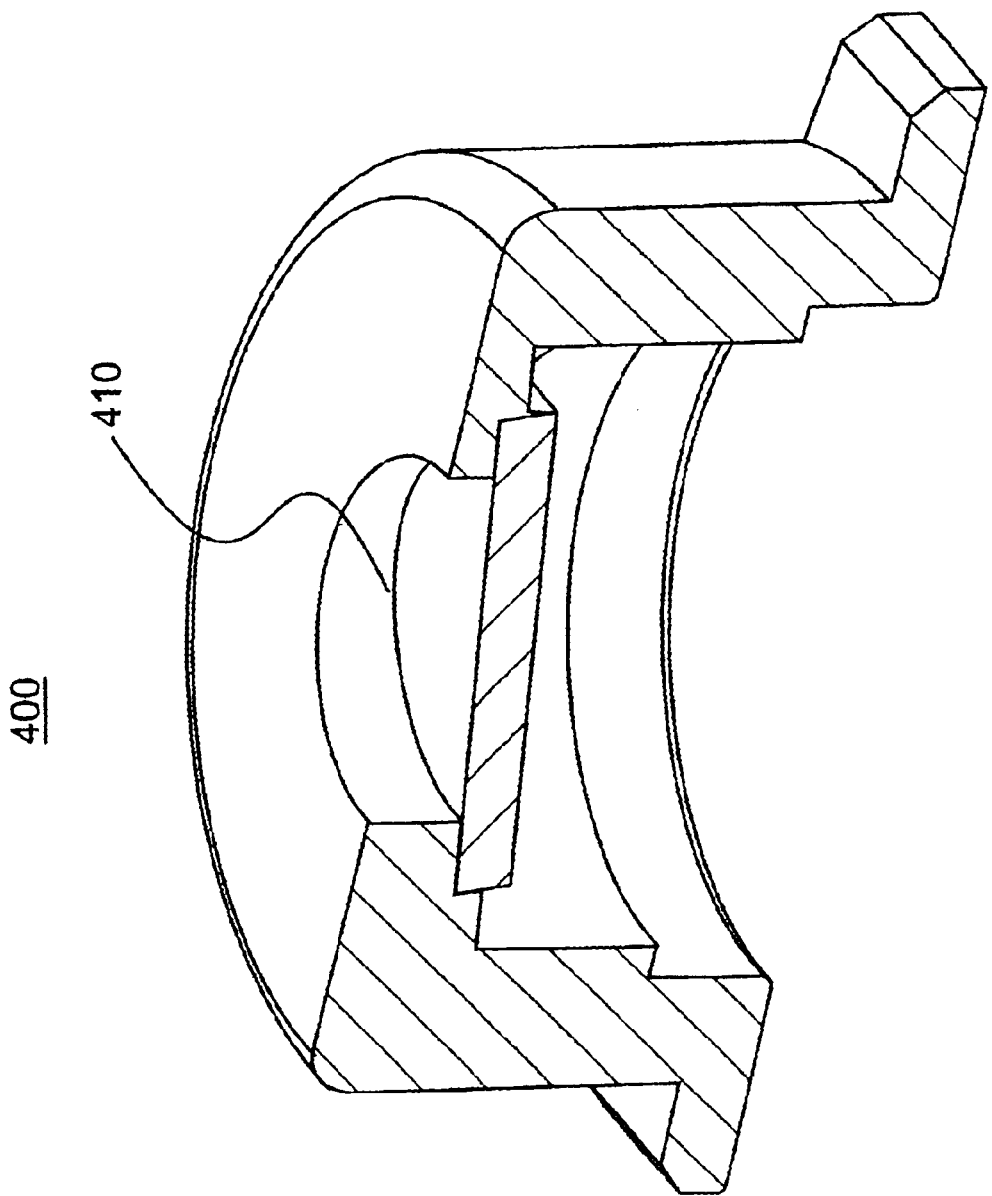
FIG. 16 illustrates a sectional view of an exemplary embodiment of a cap having a window in accordance with the principles of the present invention.
Figures 17A, 17B, 17C, 17D:
FIGS. 17A–D illustrate exemplary window embodiments in accordance with the principles of the present invention.

Referring to FIGS. 14–16, the cap 400 preferably includes an optical window 410 in a surface opposite the pedestal 230. In the case where no pedestal 230 is present in the base 200, the window 410 may be located opposite the top surface 240 of the base 200. The window 410 may or may not be transmissive for visible light. Further, the window 410 may be optically flat or it may form a lens. If a lens is used, the lens may be a ball lens, a graded index (GRIN) lens, cylindrical lens, double lens, or any other lens of a type suitable for the application. For example, if a VCSEL is provided on the pedestal 230, a ball lens may be used. The window 410 (or lens) may be formed of glass, plastic, or any other suitable optically transmissive material. In preferred embodiments, a glass window 410 (or lens) is used. Suitable materials for non-glass windows or lenses include optical polymers and copolymers such as PMMA (acrylic), polystyrene, polycarbonate, cyclic olifin polymer, and NAS®: Styrene and methyl methacrylate (MMA) copolymer. It has been found that plastic lenses are generally less costly but are more temperature sensitive than glass, have relatively low transmission near infra red compared with glass (approximately 80% transmission for plastic versus approximately 99% for glass), and have higher birefringence potential compared with glass.

The optical window 410 (or lens) may be circular, oval, rectangular, square or any other geometric shape; however, in a preferred embodiment, the window 410 (or lens) is square to improve manufacturability and reduce waste. It has been determined that square windows 410 (or lenses) may be more readily cut and molded into the cap 400 than windows 410 (or lenses) of other shapes. It has been further determined that forming the cap 400 from a moldable non-metallic material such as plastic greatly improves manufacturability in this regard, since it is believed to be impracticable to cost-effectively mass produce non-circular windows or lenses in metal die packages, such as metal TO-cans.

FIGS. 17A–D illustrates exemplary window 410 dimensions that may be used to provide circular or square optically flat windows. In this example, glass having a thickness of 0.4 mm+1–0.05 mm (FIGS. 17B and 17D) was found to provide excellent transmissivity characteristics for light having a wavelength of 850 nm. However, glass having a thickness of 0.5 mm+1–0.05 mm was also found to provide satisfactory performance for light having a wavelength of 850 nm, corresponding to the operating wavelength of certain VCSELs. The optical window 410 (shown in FIG. 18) may optionally be provided with an anti-reflective (AR) coating on one or both sides. In this example, the diameter of the circular window (FIG. 17A) was 3.5 mm and the sides of the square window (FIG. 17C) was 3.5 mm+1–0.15 mm, although windows of other shapes and sizes may be used. For example, windows having diameters (or lengths) of 1–4 mm and thickness of 0.3–0.65 mm may be used.

Figure 18:
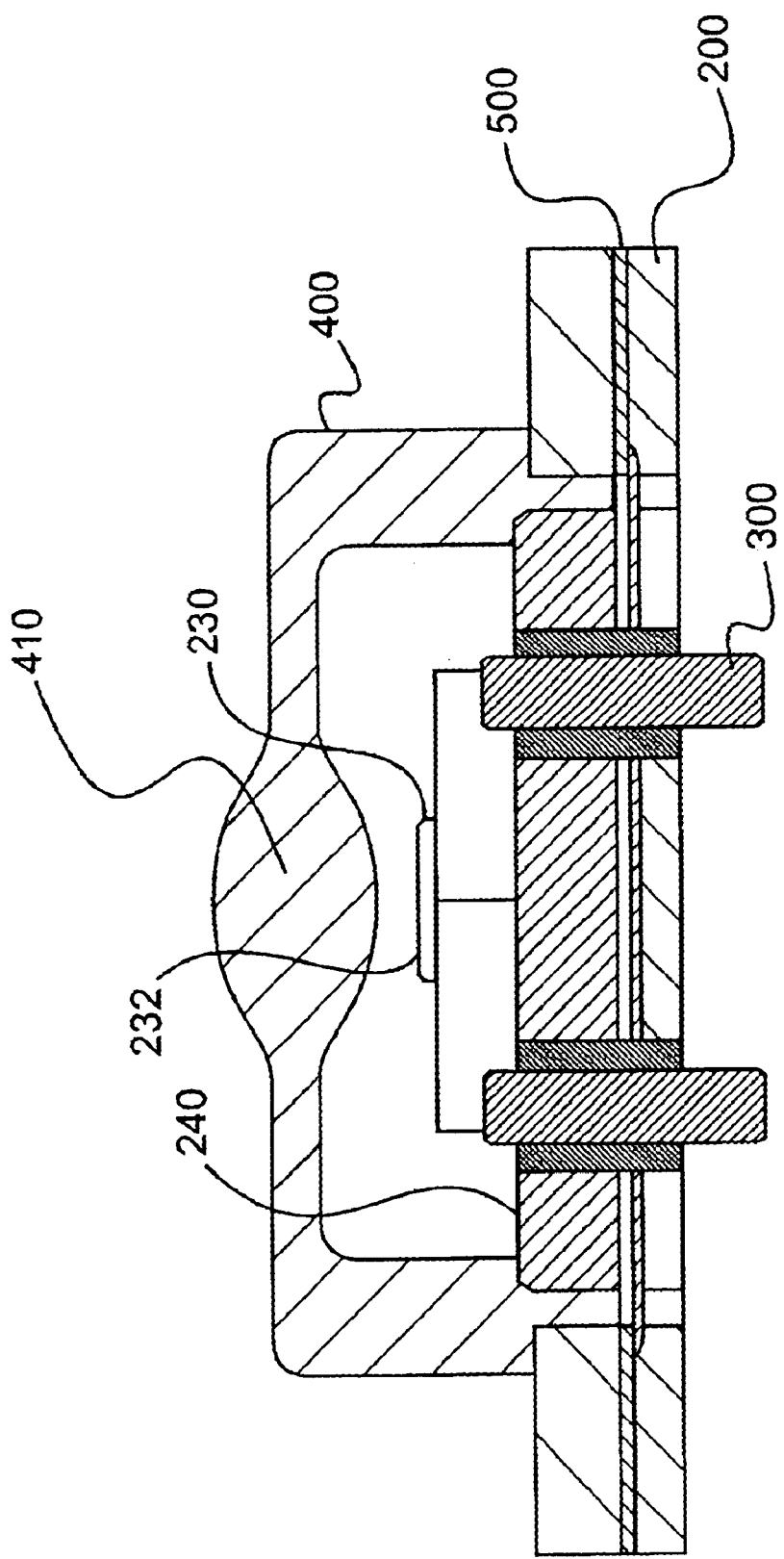
FIG. 18 illustrates a sectional view of an exemplary embodiment of a cap having a lens assembled with a base with preformed adhesive in accordance with the principles of the present invention.
Figure 19:
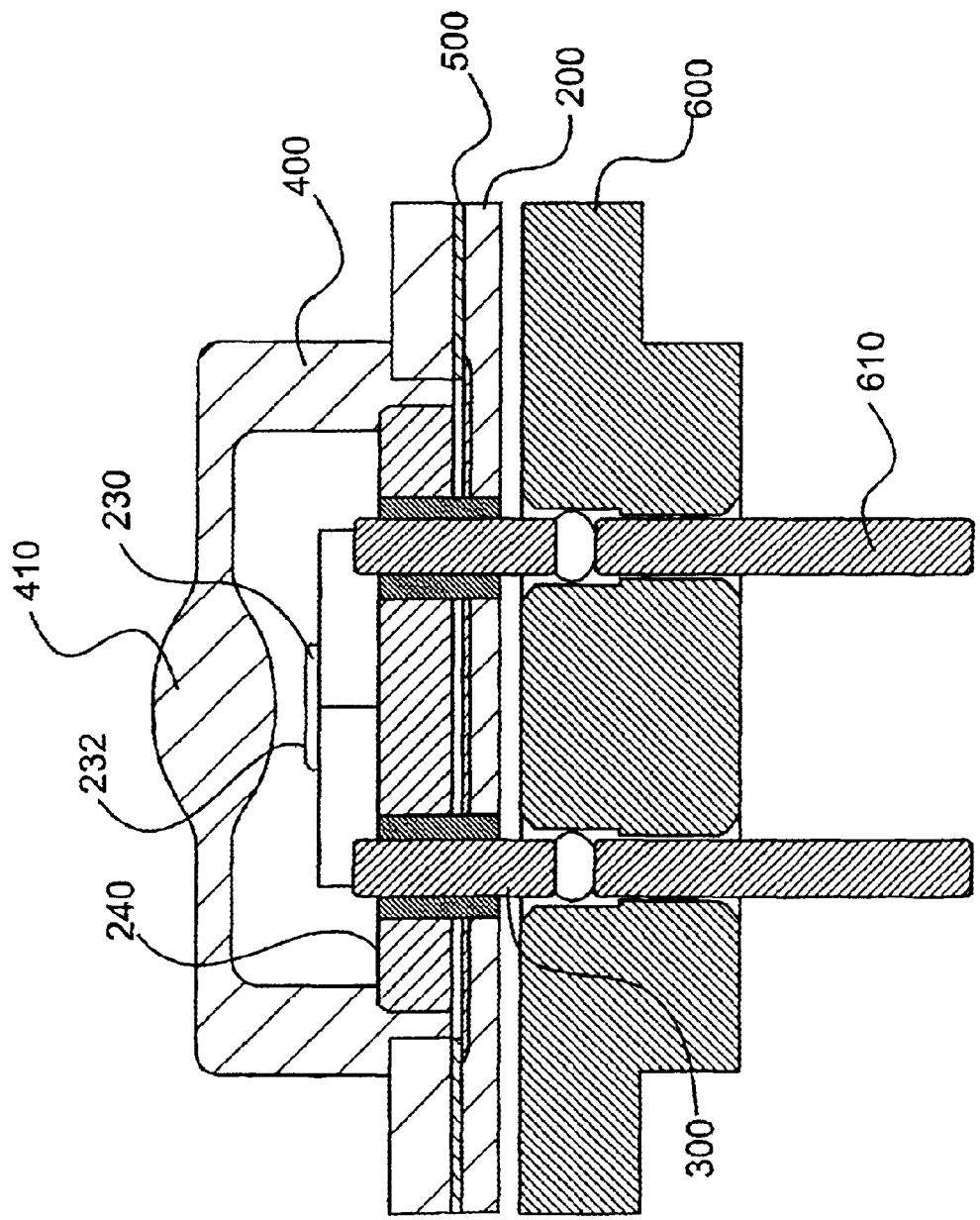
FIG. 19. illustrates a sectional view of an exemplary embodiment of a cap having a lens assembled with a base having a leg extension in accordance with the principles of the present invention.
Figure 20:
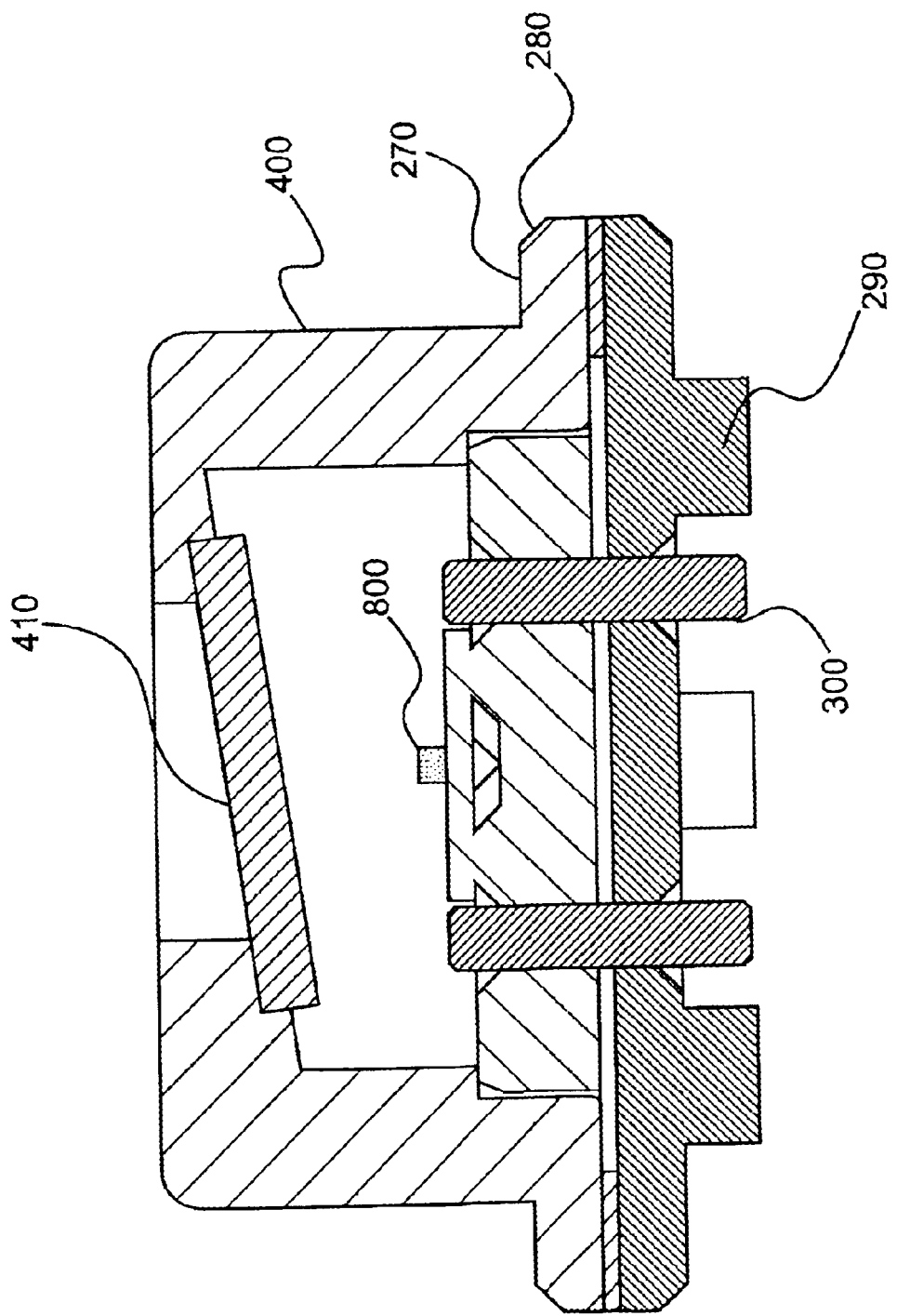
FIG. 20. illustrates an exemplary embodiment of a base with standoffs and cap having a tilted window in accordance with the principles of the present invention.
Figure 21:
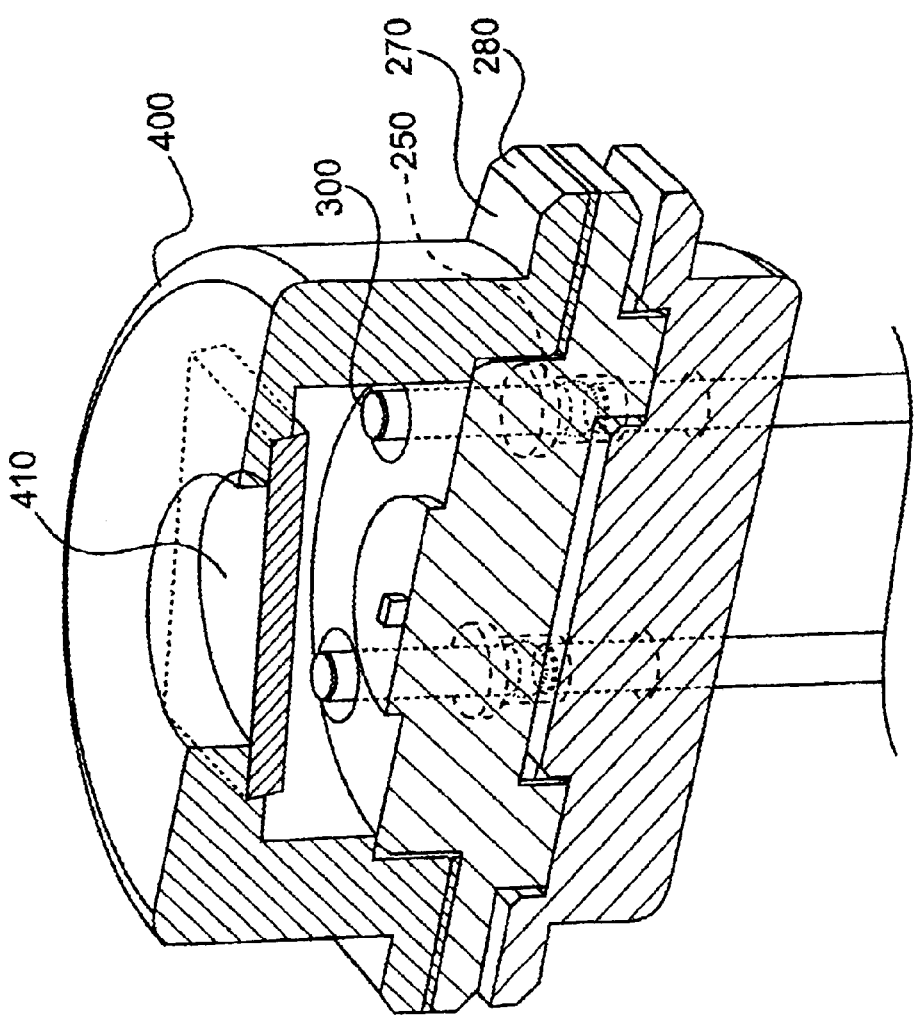
FIG. 21. illustrates an exemplary embodiment of a base with leg extensions and encapsulant wells surrounding the pins and cap having a tilted window in accordance with the principles of the present invention.
Figure 22:
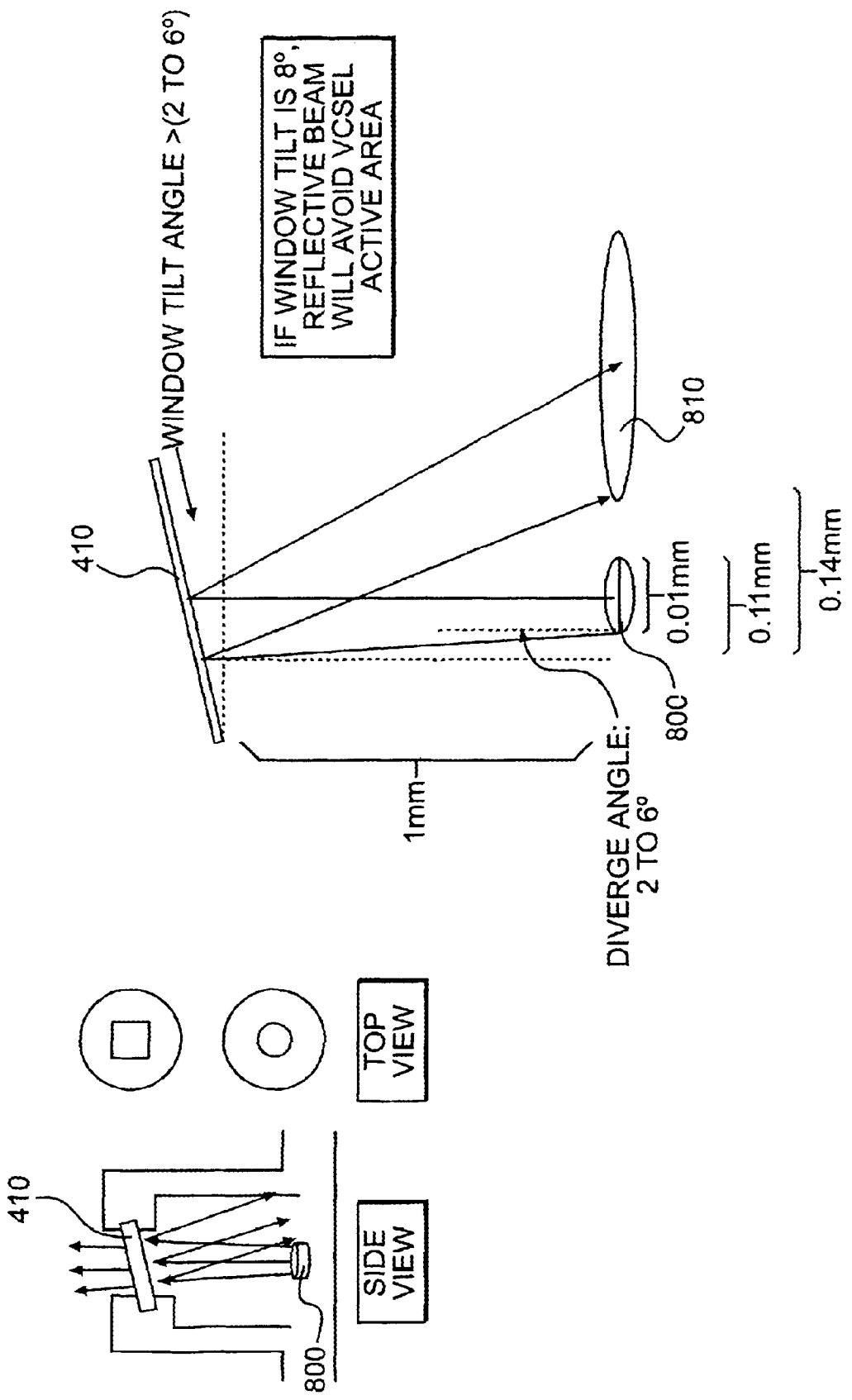
FIG. 22. illustrates an example of a signal reflected from a tilted window and received by a detector in accordance with the principles of the present invention.

As illustrated in FIGS. 18 and 19, the optical window 410 (or lens) may be mounted in the cap 400 such that it lies in a plane parallel to the surface of the pedestal 232 (or the top surface of the base 240 if no pedestal is used). Alternatively, as illustrated in FIGS. 20 and 21, the optical window 410 (or lens) may be mounted in the cap 400 such that it lies in a plane that forms a non-zero angle with the plane parallel to the surface of the pedestal 232 (or the top surface of the base 240 if no pedestal is used). This "tilt window" or "tilt lens" embodiment is particularly advantageous when light-emitting semiconductors are housed in the semiconductor package 100, since any light reflected from the window 410 (or lens) will be directed away from the active area of the light-emitting semiconductor, preventing interference with or damage to the laser, as illustrated in FIG. 22. In this manner the problem of reflected light re-entering the light emitting semiconductor device can be eliminated without resort to potentially costly anti-reflective (AR) coatings on the window 410 (or lens). Nonetheless, the "tilt window" or "tilt lens" embodiments may use AR coatings on the inner surface, outer surface or both surfaces of the window 410 (or lens). In a preferred embodiment, a window 410 having a trapezoidal or wedge-shaped cross section may be used to direct reflected light away from the active region of light emitting semiconductors housed in the semiconductor package 100.

In a preferred embodiment, the glass or plastic window 410 (or lens) may be doped to filter certain wavelengths of light. The doped window 410 (or lens) embodiments may be particularly useful when photodetectors are used to detect light having only certain wavelengths. Of course the doped window 410 (or lens) embodiments may be used with light emitting semiconductor embodiments as well.

Figure 23:
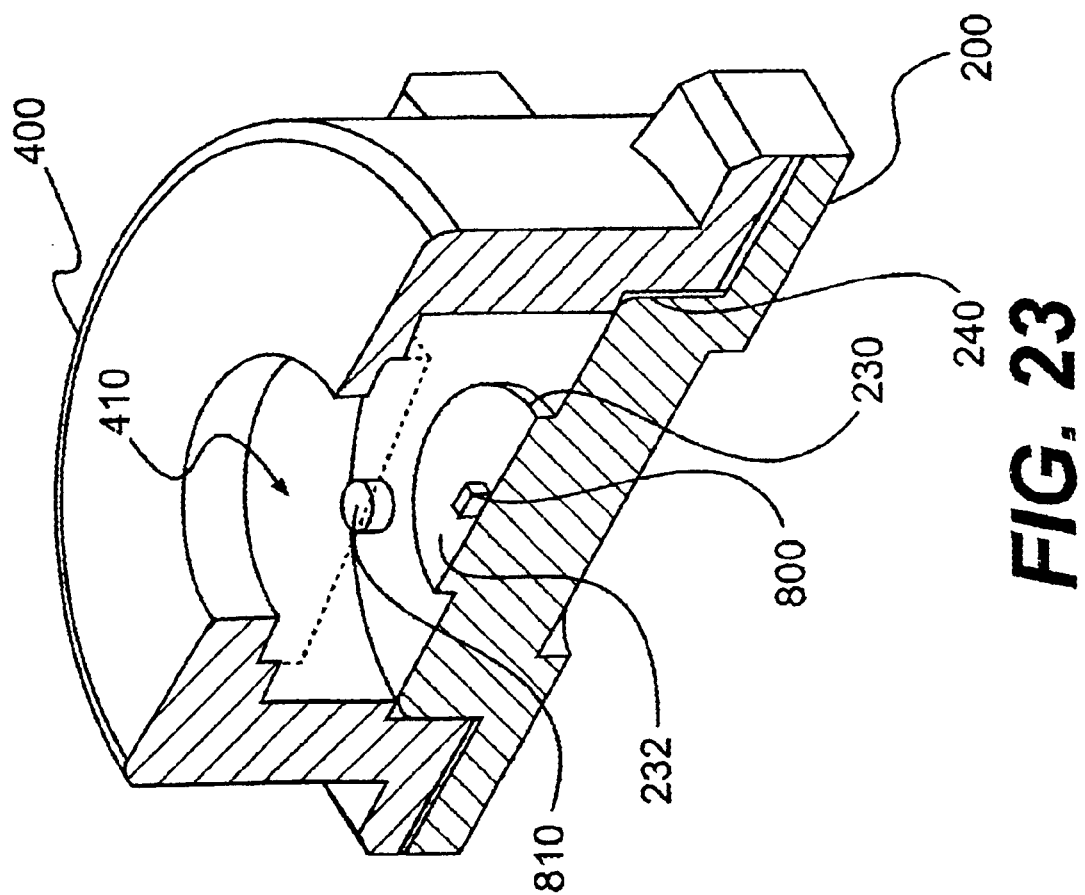
FIG. 23. illustrates an exemplary windowed cap, and base with an emitting die and detecting die in accordance with the principles of the present invention.
Figure 24:
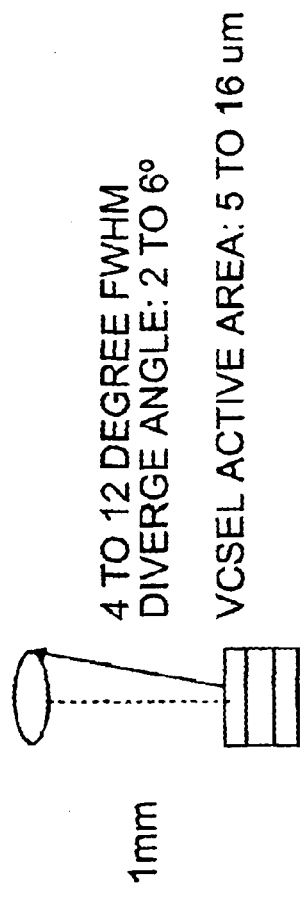
FIG. 24. illustrates exemplary VCSEL beam divergence in accordance with the principles of the present invention.
Figure 25:
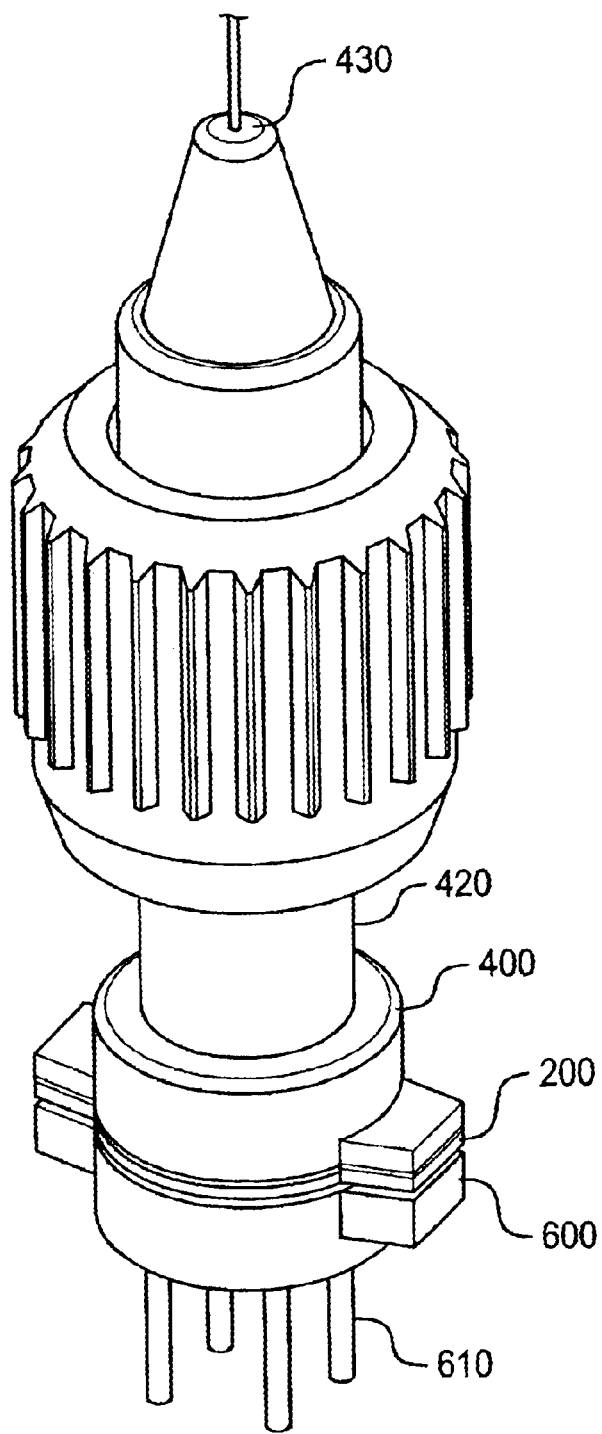
FIG. 25. illustrates an exemplary optical fiber coupling in accordance with the principles of the present invention.
Figure 26:
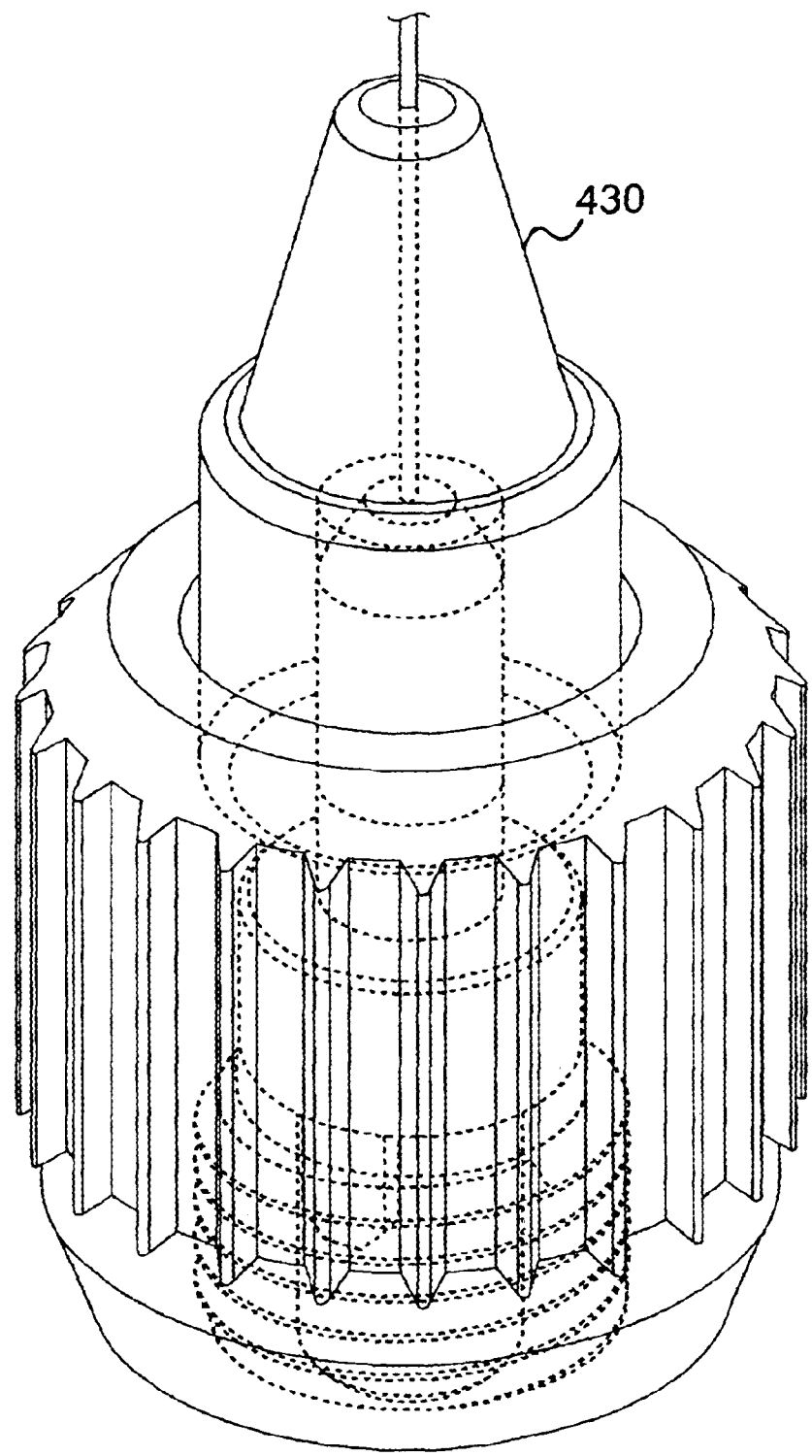
FIG. 26. illustrates an exemplary optical fiber coupling in accordance with the principles of the present invention.
Figure 27:
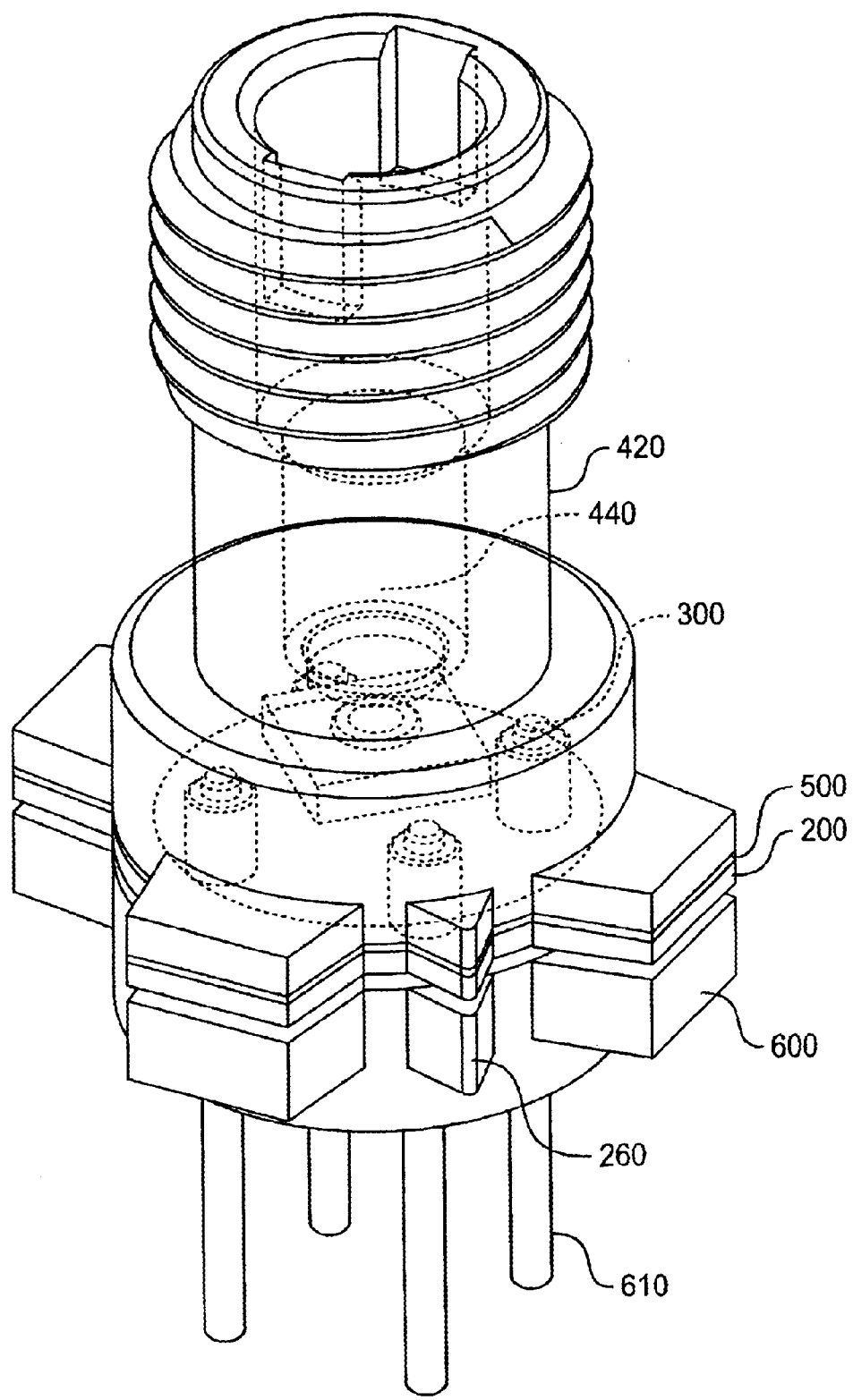
FIG. 27. illustrates an exemplary optical fiber coupling with a lens in accordance with the principles of the present invention.
Figure 28:
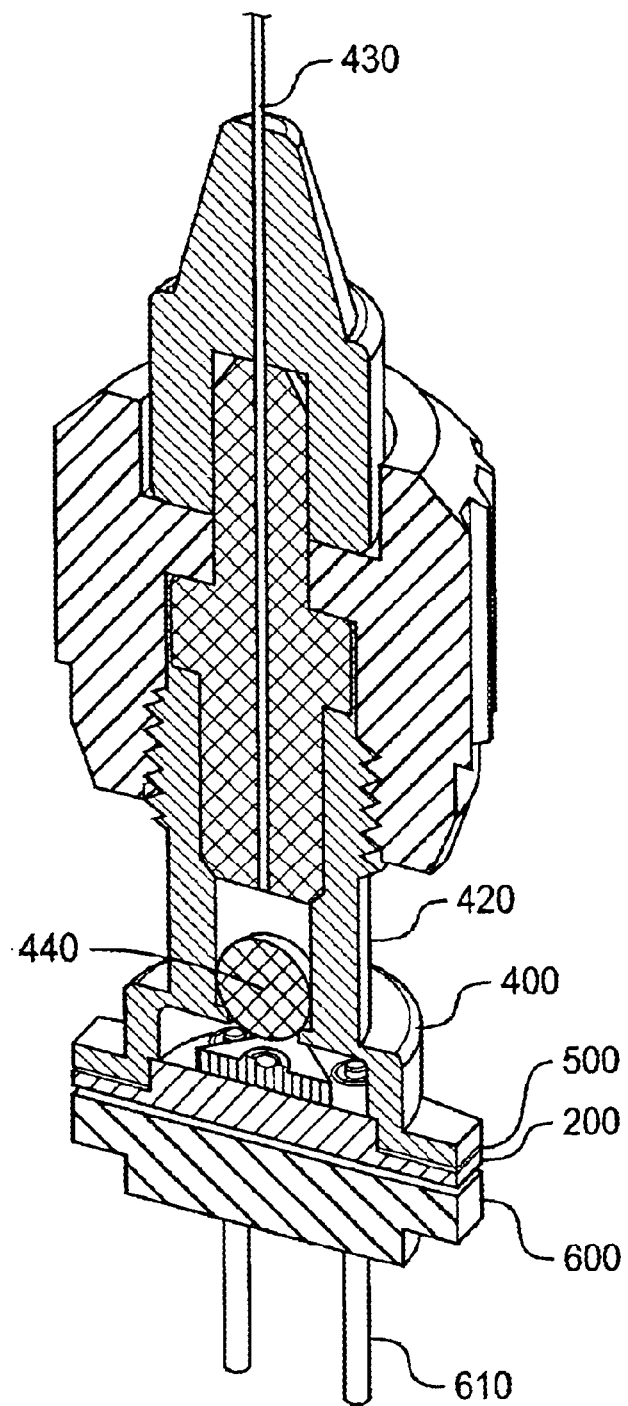
FIG. 28. illustrates an exemplary optical fiber coupling with a lens in accordance with the principles of the present invention.

Referring to FIGS. 22–24, a further advantage of the "tilt window" or "tilt lens" embodiment, it that the reflected portion of the beam may be directed to a detector 810 mounted within the semiconductor package to control the modulation or the laser or otherwise monitor the performance of the laser. In many applications of laser diodes it is desirable to monitor the output beam of the laser diode with a photodetector 810, such as a photodiode, in order to modulate the laser output and maintain a constant power level. For example, if a VCSEL laser is used as the light-emitting device, a detector 810 can be mounted within the die package 100 to receive the reflected portion of the light and form a feedback loop to modulate the VCSEL output. As shown in FIG. 23, the detector 810 may be located, for example, on the surface of the pedestal 232 or on the top surface 240 of the base 200. The detector 810 may comprise a PIN diode photodetector or any other suitable photodetecting device. As illustrated in FIG. 22, it has been determined that a window tilt of 8 degrees diverts the reflected beam sufficiently away from a VCSEL while providing adequate transmissivity (low insertion loss) and a reflected signal of adequate strength for the detector 810. Of course, the tilt angle is influenced by the divergence of light from the laser and the distance of the window from the laser.

Referring to FIGS. 25–28, for fiber optic applications the cap 400 may optionally be provided with a connector 420 capable of receiving an optical fiber pig tail 430. The connector 420 may be a cylindrical threaded male connector, as depicted, or any conventional type of threaded or unthreaded optical connector. The connector 420 may be integrally molded with the cap 400 or the connector 420 may be separately formed and later affixed to the cap by any conventional means. An optional lens 440 may be operatively positioned in the connector 420 or in the connector of the pig tail 430. A photodetector 810 (shown in FIG. 23), such as a PIN diode, may be positioned on the base 200 or pedestal 230 for receiving an optical signal transmitted from the optical fiber pig tail 430 through the connector 420 and lens 440 (if present). Alternatively or in combination, a photo-emitting device, such as a VCSEL laser diode, may be positioned on the base 200 or pedestal 230 for transmitting an optical signal through the lens 440 (if present) and connector 420 to the optical fiber pig tail 430. Examples of optical coupling combinations that may be used for fiber applications include ball lens coupling, aspheric lens coupling, GRIN lens coupling, butt coupling, and lensed fiber coupling.

Figure 29:
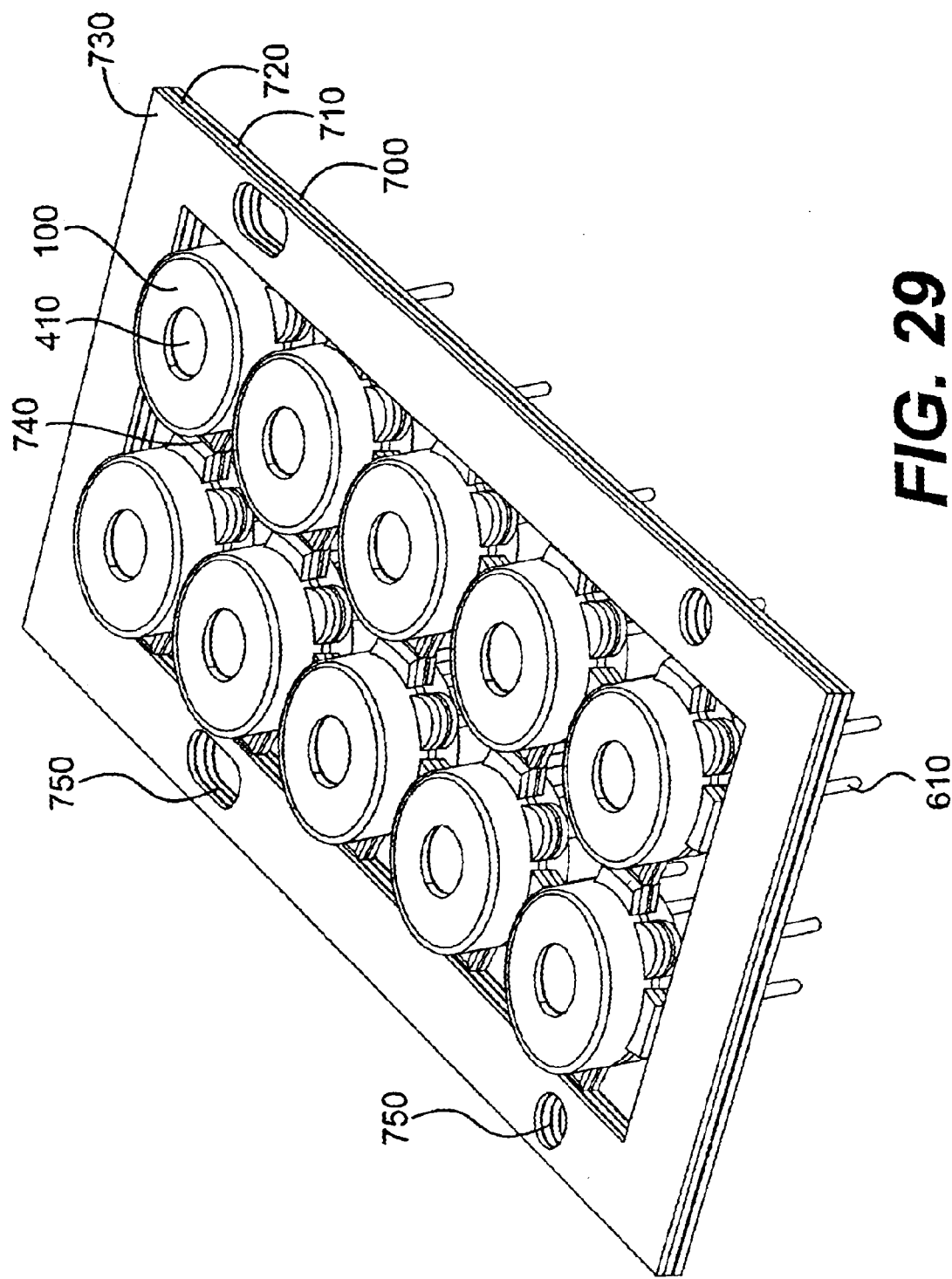
FIG. 29. illustrates an exemplary matrix or array of die packages in a stacked assembly in accordance with the principles of the present invention.
Figure 30:
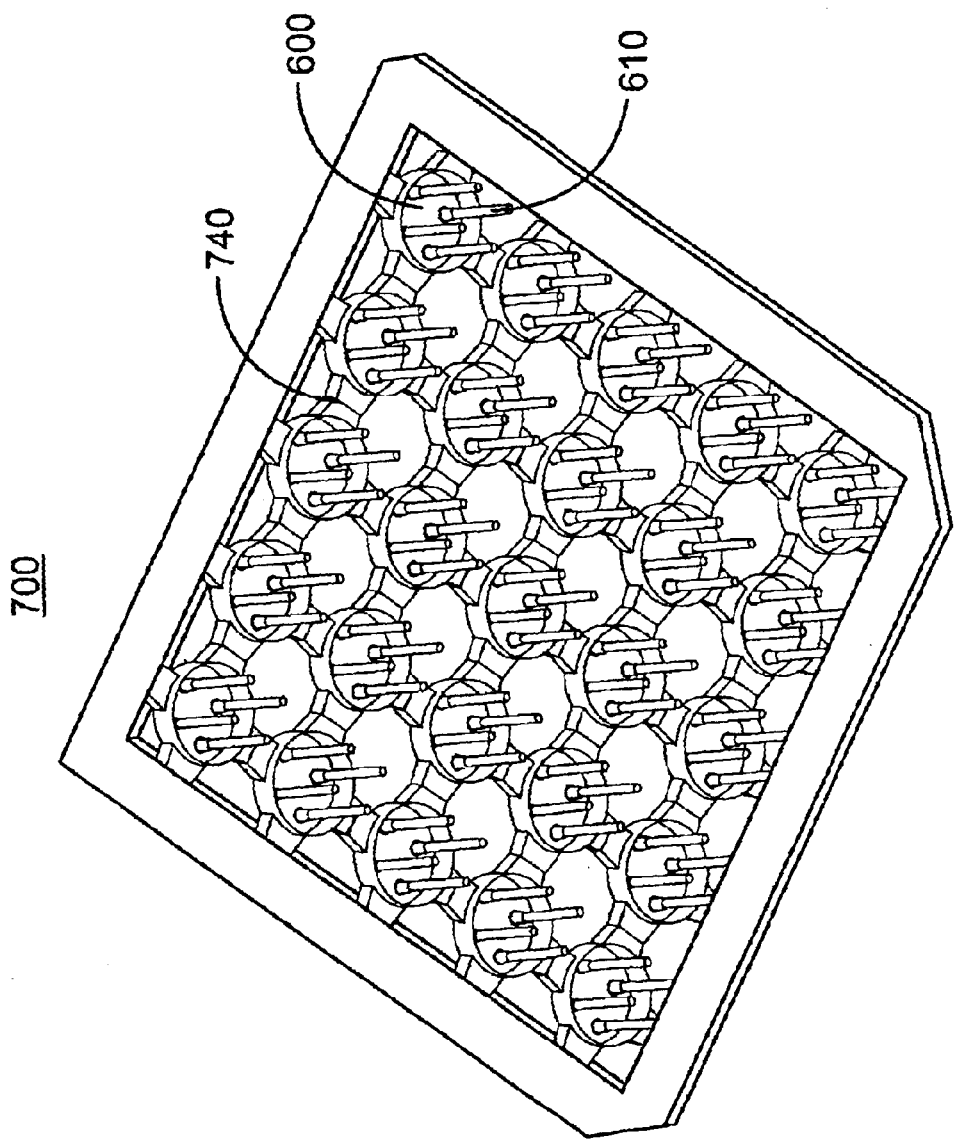
FIG. 30. illustrates an exemplary matrix of leg extensions in accordance with the principles of the present invention.
Figure 31:
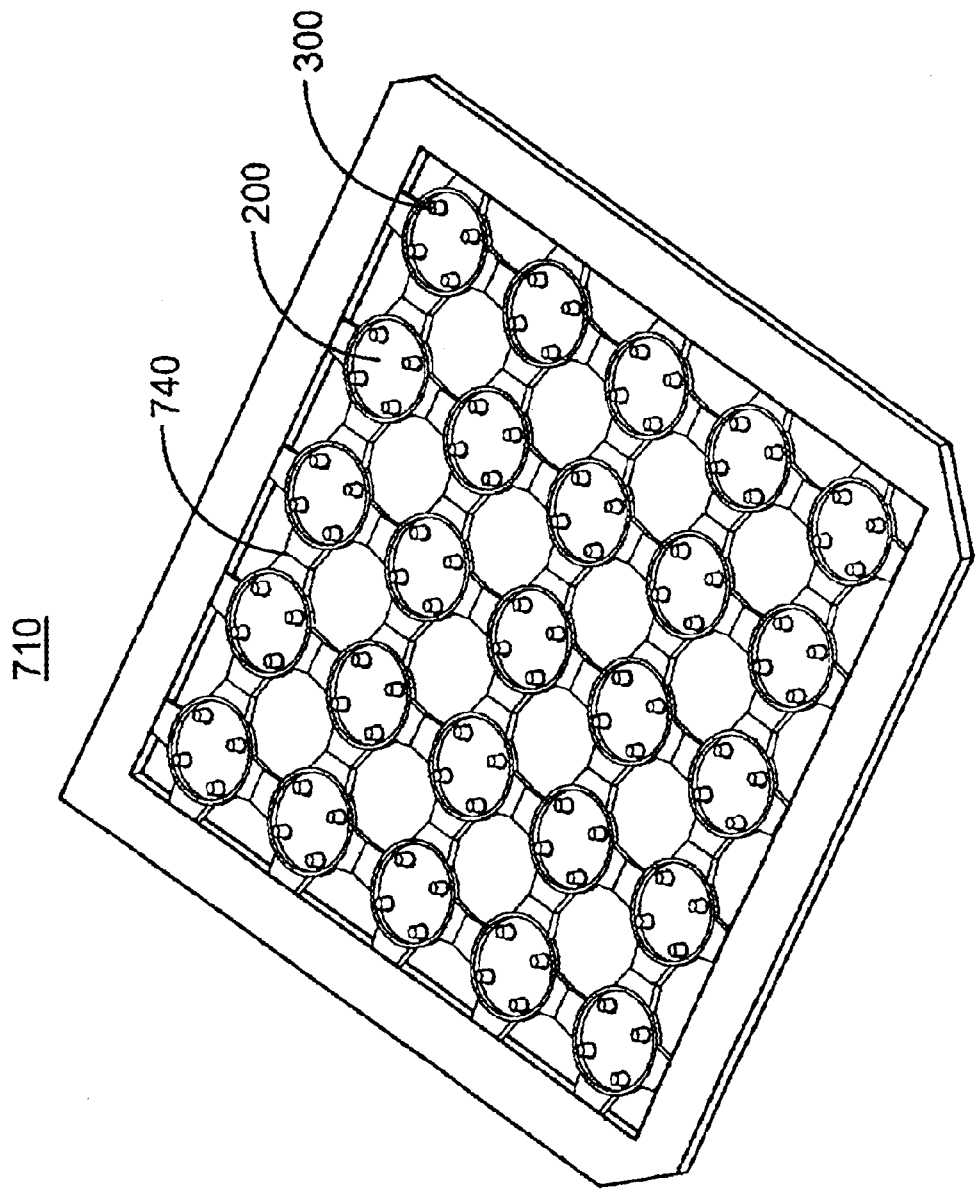
FIG. 31. illustrates an exemplary matrix of bases in accordance with the principles of the present invention.
Figure 32:
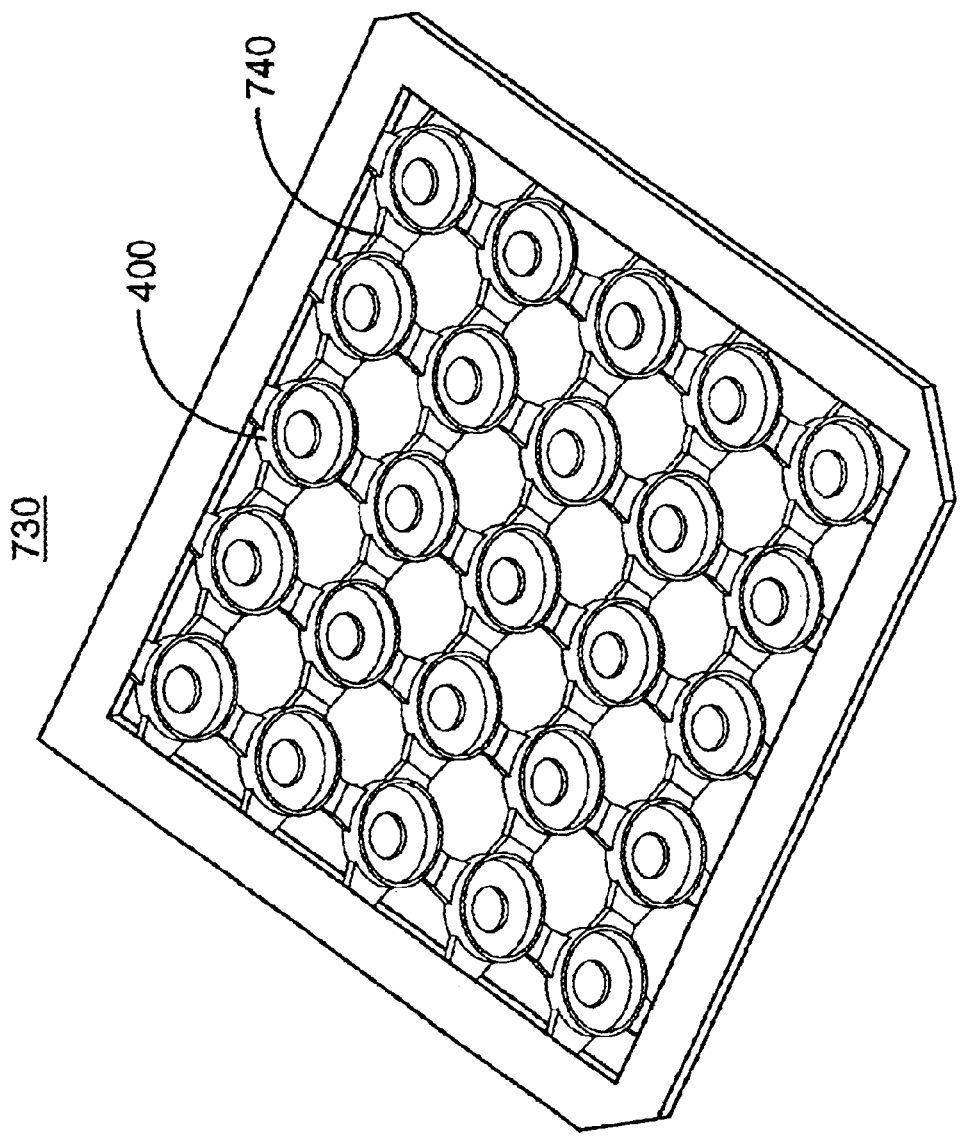
FIG. 32. illustrates an exemplary matrix of caps in accordance with the principles of the present invention.

As shown in FIG. 29, die packages 100 may preferably be assembled in layered matrix arrays to achieve economy of scale through batch processing, thereby reducing manufacturing costs. For example, a leg extension layer matrix 700 (FIG. 30) comprising a matrix of preformed leg extension subassemblies 600 may be bonded to a base layer matrix 710 (FIG. 31) comprising a matrix of pre-formed base subassemblies 200, which may in-turn be bonded to a cap layer matrix 730 (FIG. 32) comprising a matrix of pre-formed caps 400. The layers may be assembled in any order. For example, the base layer matrix 710 may be mated with the cap layer matrix 730 before a leg extension layer matrix 700 (if present) is affixed to the base layer matrix 710. Alternatively, the base layer matrix 710 may be mated with a leg extension layer matrix 700 (if present) before the cap layer matrix 730 is affixed to the base layer matrix 710. Predetermined "v-groove" shaped separation lines 740 are preferably molded between individual components in each matrix layer to provide for easy separation of the die packages 100 after assembly. Alignment holes 750 may optionally be formed in a margin of each layer to ensure correct alignment between layers during assembly.

Figure 33:
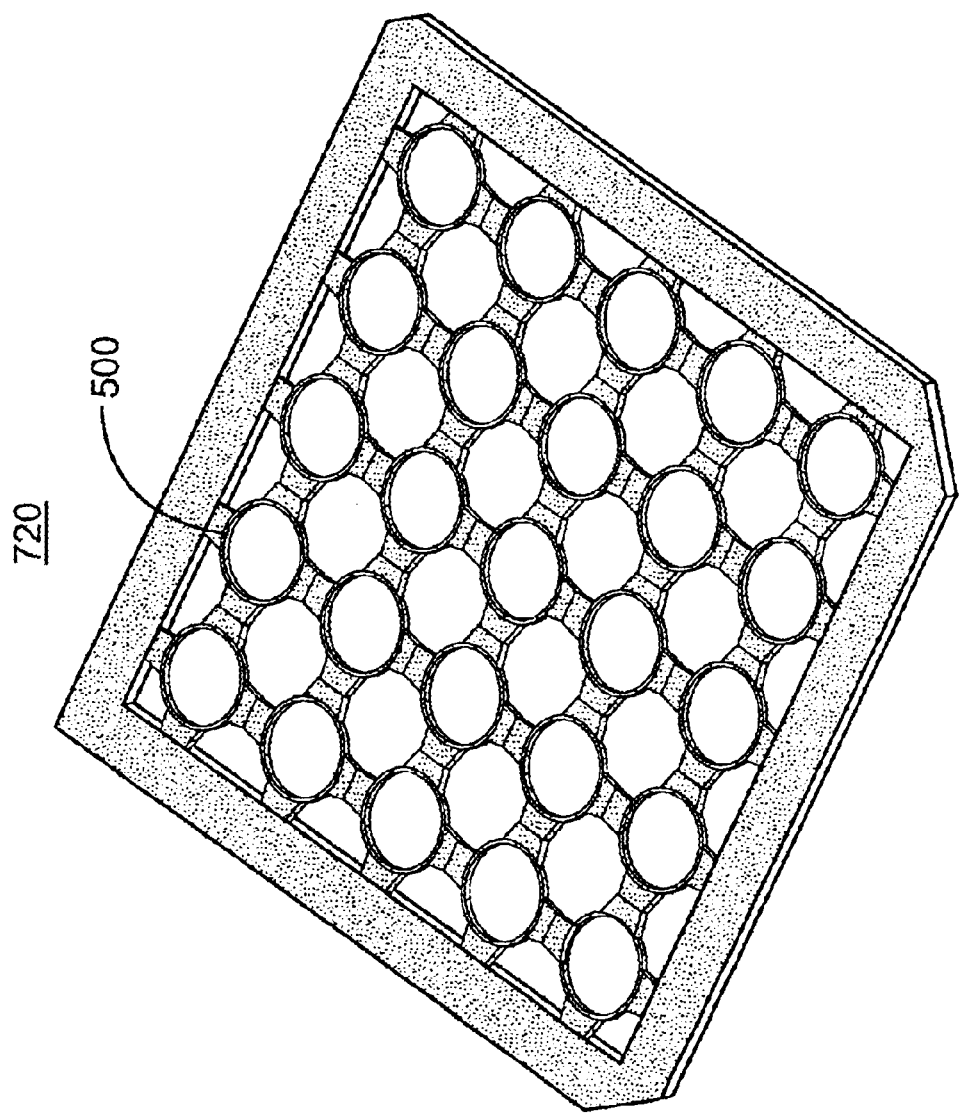
FIG. 33. illustrates an exemplary matrix of adhesive in accordance with the principles of the present invention.
Figure 34:
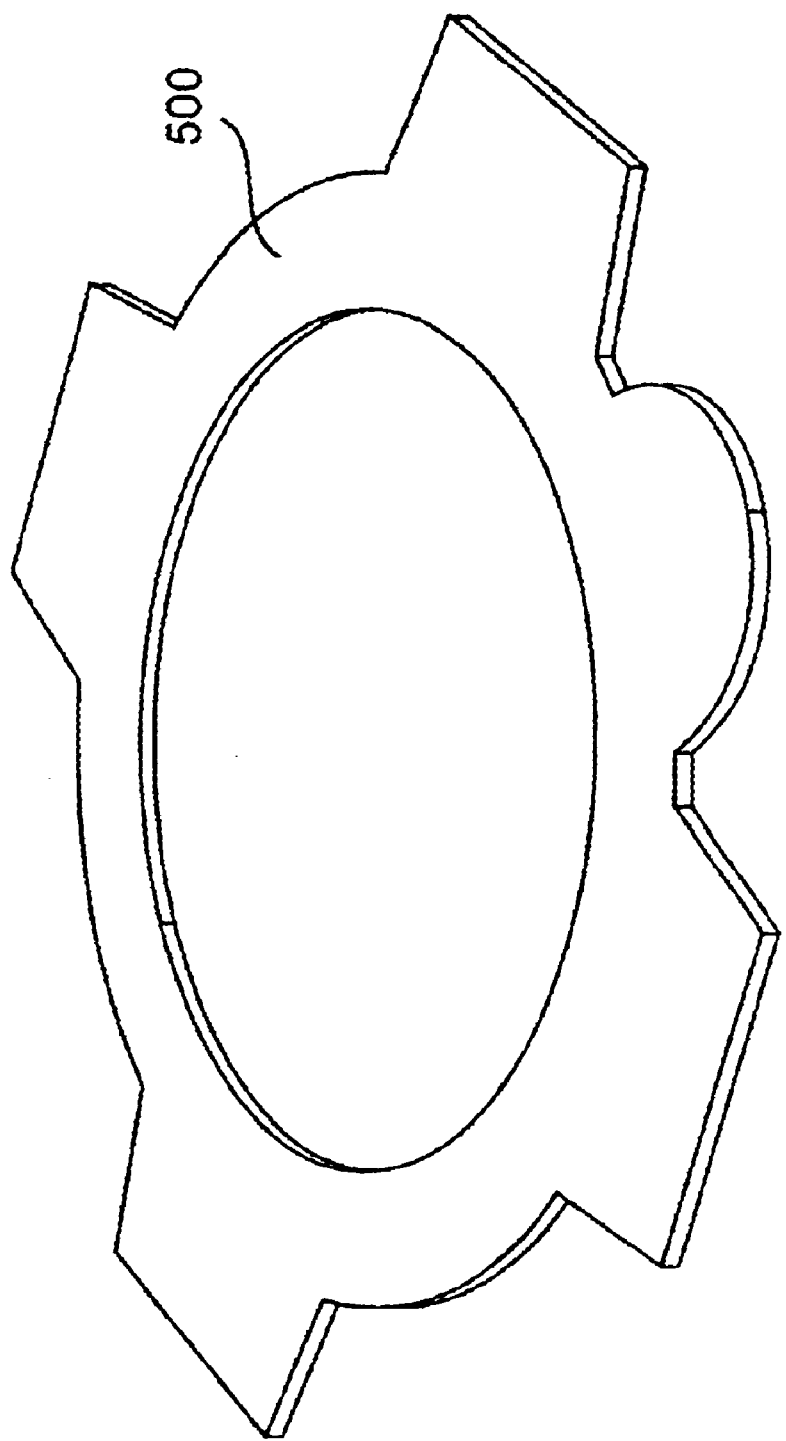
FIG. 34. illustrates exemplary preformed adhesive in accordance with the principles of the present invention.

To further enable efficient assembly, the base layer matrix 710 (FIG. 31) and cap layer matrix 730 (FIG. 32) may be bonded together using a preformed matrix of adhesive 720 (FIG. 33). The preformed matrix of adhesive 720 preferably comprises a plurality of epoxy rings 500, as depicted in FIG. 34. Alternatively or in addition, any suitable adhesive or other bonding method may be used to affix the cap layer 730 to the base layer 710.

Referring again to FIGS. 4–6, tabs 270 used to connect adjacent bases 200 in the base layer matrix 710 during the manufacturing process may extend radially outward from the periphery of the base 200. When separated from the matrix, the tabs 270 may have chamfered or beveled leading edges 280 corresponding to the predetermined "v-groove" shaped separation lines 740 formed between adjacent bases 200 in the base layer matrix 710. As shown in FIGS. 11 and 14, similar tabs 270 having chamfered or beveled leading edges 280 may also be formed in the cap 400 and optional leg extension 600 (if present). After assembly, the tabs 270 may be advantageously used as headers to retain completed die packages 100 during assembly of the die package 100 onto a printed circuit board. The tabs 270 may also be used to mount the completed die package 100.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but have the full scope defined by the language of the following claims, and equivalents thereof.

What is claimed is:

1. A semiconductor die package comprising:
    a polymer base comprising a lower surface and an upper surface, the upper surface for mounting at least one semiconductor die;
    a polymer cap operatively secured over at least a portion of the upper surface of the base forming a cavity, the cap having a light transmissive member operatively positioned to allow light of predetermined wavelengths to pass between at least a portion of the upper surface of the base and the light transmissive member;
    a plurality of conductive leads extending through the base from the lower surface of the base to the cavity; and
    a leg extension having a plurality of conductive legs, the leg extension being mounted on the lower surface of the polymer base, wherein at least one of the plurality of conductive legs are in electrical communication with at least one of the plurality of conductive leads extending through the base.

2. The semiconductor die package according to claim 1, further comprising a semiconductor die mounted on the upper surface of the polymer base, the semiconductor die being in electrical communication with at least one of the plurality of conductive leads extending through the base.

3. The semiconductor die package according to claim 1, wherein the conductive leads comprise an outer conductive layer coaxially arranged around a dielectric layer and a center conductor.

4. The semiconductor die package according to claim 1, wherein the conductive leads comprise an outer conductive layer coaxially arranged around a dielectric layer and a center conductor, and the conductive legs comprise a second outer conductive layer coaxially arranged around a second dielectric layer and a second center conductor.

5. The semiconductor die package according to claim 1, wherein the light transmissive member comprises a grated index lens.

6. The semiconductor die package according to claim 1, wherein the light transmissive member comprises a ball lens.

7. The semiconductor die package according to claim 1, wherein the light transmissive member comprises a square window.

8. The semiconductor die package according to claim 1, wherein the light transmissive member lies in a plane forming a non-zero angle with the plane containing the upper surface of the base.

9. The semiconductor die package according to claim 1, wherein the polymer cap further comprises a receptacle for receiving an optical connector.

10. The semiconductor die package according to claim 1, the upper surface of the polymer base further comprising a pedestal for mounting a semiconductor die.

11. A matrix of semiconductor die packages comprising:
a base matrix comprising a plurality of polymer bases, each base comprising a surface for mounting at least one semiconductor die;
a cap matrix comprising a plurality of polymer caps operatively secured over the base matrix, each base and cap combination forming a cavity, each cap having a light transmissive member operatively positioned to allow light of predetermined wavelengths to pass between the surface for mounting at least one semiconductor die of a corresponding base and the light transmissive member;
a plurality of conductive leads extending through each base from an outside surface of each base to the corresponding cavity formed by each cap and base combination; and
a leg extension matrix, each leg extension in the leg extension matrix having a plurality of conductive legs, the leg extension matrix being mounted on the lower surface of the base matrix, wherein at least one of the plurality of conductive legs of each leg extension are in electrical communication with at least one of the plurality of conductive leads of the corresponding base.

12. The matrix of semiconductor die packages according to claim 11, wherein a plurality of the bases comprising the base matrix have a semiconductor die mounted on the surface and being in electrical communication with at least one of the plurality of conductive leads extending through each base.

13. The matrix of semiconductor die packages according to claim 11, wherein the conductive leads comprise an outer conductive layer coaxially arranged around a dielectric layer and a center conductor.

14. The matrix of semiconductor die packages according to claim 11, wherein the conductive leads comprise an outer conductive layer coaxially arranged around a dielectric layer and a center conductor, and the conductive legs comprise a second outer conductive layer coaxially arranged around a second dielectric layer and a second center conductor.

15. The matrix of semiconductor die packages according to claim 11, wherein the iight transmissive member comprises a grated index lens.

16. The matrix of semiconductor die packages according to claim 11, wherein the light transmissive member comprises a ball lens.

17. The matrix of semiconductor die packages according to claim 11, wherein the light transmissive member comprises a square window.

18. The matrix of semiconductor die packages according to claim 11, wherein a plurality of the light transmissive members lie in a plane forming a non-zero angle with the plane containing the upper surface of each base.

19. The matrix of semiconductor die packages according to claim 11, wherein a plurality of caps comprising the cap matrix further comprise a receptacle for receiving an optical connector.

20. The matrix of semiconductor die packages according to claim 11, wherein a plurality of the bases comprising the base matrix further comprise a pedestal for mounting a semiconductor die.

21. The matrix of semiconductor die packages according to claim 11, wherein separation lines are molded between a plurality of the bases in the base matrix and between a plurality of the caps in the cap matrix.

* * * * *